(12) United States Patent
Downie et al.

(10) Patent No.: US 10,983,267 B2
(45) Date of Patent: Apr. 20, 2021

(54) QUASI-SINGLE-MODE OPTICAL FIBER

(71) Applicant: Corning Incorporated, Corning, NY (US)

(72) Inventors: John David Downie, Painted Post, NY (US); Ming-Jun Li, Horseheads, NY (US); William Allen Wood, Painted Post, NY (US); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/269,112

(22) Filed: Feb. 6, 2019

(65) Prior Publication Data

US 2019/0278019 A1 Sep. 12, 2019

Related U.S. Application Data

(60) Provisional application No. 62/640,262, filed on Mar. 8, 2018.

(51) Int. Cl.
*G02B 6/02* (2006.01)
*G02B 6/036* (2006.01)
*G02B 6/028* (2006.01)

(52) U.S. Cl.
CPC ..... *G02B 6/02019* (2013.01); *G02B 6/03627* (2013.01); *G02B 6/028* (2013.01);
(Continued)

(58) Field of Classification Search
None
See application file for complete search history.

(56) References Cited

U.S. PATENT DOCUMENTS 6,078,715 A 6/2000 Fujii et al.
7,340,131 B2 3/2008 Nakanna et al.
(Continued)

FOREIGN PATENT DOCUMENTS

EP 1096279 A1 5/2001
JP 03321238 B2 9/2002
(Continued)

OTHER PUBLICATIONS

Lenahan; "Calculation of Modes in an Optical Fiber Using a Finite Element Method and Eispack, "Bell Syst. Tech. J., vol. 62, No. 1, p. 2663, Feb. 1983.
(Continued)

*Primary Examiner* — Michelle R Connelly
(74) *Attorney, Agent, or Firm* — Smit Kapadia

(57) ABSTRACT

A quasi-single-mode (QSM) optical fiber includes a core and a cladding surrounding the core. The core includes a centerline and an outer edge. The cladding includes an interior edge and an exterior edge. The cladding has a cladding outer diameter defined by the exterior edge of the cladding. The cladding outer diameter may be in the range of greater than 170 μm to about 200 μm. The QSM fiber has a cabled cutoff wavelength that is greater than about 1530 nm. The core and the cladding support a fundamental mode $LP_{01}$ and a higher-order mode $LP_{11}$. The fundamental mode $LP_{01}$ has an effective area $A_{eff} > 150 \ \mu m^2$.

20 Claims, 13 Drawing Sheets

(52) U.S. Cl.
CPC ........ *G02B 6/02023* (2013.01); *G02B 6/0281* (2013.01); *G02B 6/02095* (2013.01); *G02B 6/0365* (2013.01)

(56) References Cited

U.S. PATENT DOCUMENTS

| | | | |
|---|---|---|---|
| 7,526,169 | B2 | 4/2009 | Bickham et al. |
| 7,561,769 | B2 | 7/2009 | Fujimoto et al. |
| 9,128,237 | B2 | 9/2015 | Mukasa |
| 9,841,555 | B2 | 12/2017 | Downie et al. |
| 9,846,275 | B2 | 12/2017 | Li et al. |
| 2013/0071115 | A1 | 3/2013 | Bennett et al. |
| 2014/0029906 | A1* | 1/2014 | Mukasa ............. G02B 6/02042 385/126 |
| 2016/0091660 | A1* | 3/2016 | Li ..................... G02B 6/02019 398/143 |
| 2017/0131468 | A1 | 5/2017 | Kawaguchi et al. |

FOREIGN PATENT DOCUMENTS

| | | |
|---|---|---|
| JP | 2009265310 A | 11/2009 |
| JP | 05412608 B2 | 2/2014 |

OTHER PUBLICATIONS

Downie et al; "MPI Measurements of Quasi-Single-Mode Fibers"; IEEE Photonics Conference, paper MG3.4, (2015); pp. 273-274.

Jeunhomme; "Single Mode Fiber Optics"; Marcel Dekker; New York, 1990; pp. 39-44.

Mlejnek et al; "Coupled-Mode Theory of Multipath Interference in Quasi-Single Mode Fibers"; IEEE Photonics Journal; vol. 7, No. 1, Feb. 2015; 17 Pages.

Sui et al; "Long-Haul Quasi-Single-Mode Transmissions Using Few-Mode Fiber in Presence of Multi-Path Interference"; Optics Express, vol. 23, No. 3; 2015; 14 Pages.

Tsukitani et al; "Ultra Low Nonlinearity Pure-Silica-Core Fiber With an Effective Area of 211um2 and Transmission Loss of -0.159dB/km"; 2002 28th European Conference on Optical Communication; IEEE; 2 Pages.

Downie et al. "Quasi-single-mode fiber transmission for optical communications", IEEE Journal of Selected Topics in Quantum Electronics 23(3) 2017, pp. 31-42.

International Search Report and Written Opinion PCT/US2019021297 dated Jun. 4, 2019, 12 Pgs.

\* cited by examiner

QUASI-SINGLE-MODE OPTICAL FIBER

This application claims the benefit of priority to U.S. Provisional Application Ser. No. 62/640,262 filed on Mar. 8, 2018, the content of which is relied upon and incorporated herein by reference in its entirety.

FIELD

The present disclosure generally relates to optical fibers. More particularly, the disclosure relates to quasi-single-mode optical fibers.

BACKGROUND

Optical fibers are used for a variety of applications, especially in long-haul, high-speed optical communications systems. Optical fibers have an optical waveguide structure that acts to confine light to within a central region of the fiber. One of the many benefits of optical fibers is their ability to carry a large number of optical signals in different channels, which provides for high data transmission rates and a large bandwidth.

The increasing demand for bandwidth and higher data transmission rates has resulted in optical fibers carrying more channels and higher amounts of optical power. At some point, however, the optical power carried by the optical fiber can give rise to non-linear effects that distort the optical signals and reduce the transmission capacity of the optical communications system. Consequently, there is a practical limit to how much optical power an optical fiber can carry.

Because the optical power is confined by the waveguide structure of the optical fiber, the intensity determines the severity of non-linear effects in the optical fiber. The intensity is defined as the amount of optical power in the guided light divided by the (cross-sectional) area over which the guided light is distributed. This area is referred to in the art as the "effective area" $A_{\it eff}$ of the optical fiber. The effective area $A_{\it eff}$ is calculated from the electromagnetic field distribution of the light traveling within the optical fiber using techniques and methods known in the art.

It is well-known that optical fibers with large effective areas $A_{\it eff}$ are desirable in optical transmission systems because of their relatively high power threshold for nonlinear distortion impairments. The larger the effective area $A_{\it eff}$, the lower the intensity and thus the less non-linear effects. Because of this feature, an optical fiber with a large effective area $A_{\it eff}$ may be operated at higher optical powers, thereby increasing the optical signal-to-noise ratio (OSNR).

Unfortunately, the effective area $A_{\it eff}$ of optical fibers cannot simply be increased without bound. The conventional wisdom in the art is that an effective area $A_{\it eff}$ of about 150 µm² is the limit for a true single-mode fiber to maintain sufficient bend robustness, (i.e., reduced loss due to bending). In some cases, an effective area $A_{\it eff}$ of 150 µm² may in fact already be too large for some bending-loss requirements. However, the bending loss of an optical fiber can be reduced by increasing the mode confinement and hence the cutoff wavelength of the optical fiber associated with single-mode operation. Increasing the effective area $A_{\it eff}$ beyond present-day values would require raising the cutoff wavelength to be above the signal wavelength, thereby resulting in few-mode operation, which gives rise to undesirable optical transmission impairments such as modal dispersion and multipath interference (MPI).

Alternatives to increasing the effective area $A_{\it eff}$ of the optical fiber to reduce adverse non-linear effects include decreasing the effective nonlinear index $n_2$. The nonlinear physics of an optical fiber depends on the ratio $n_2/A_{\it eff}$. However, changing $n_2$ is difficult and the resulting effect is likely to be very small. Reducing the fiber attenuation is another alternative for better transmission performance. A lower fiber attenuation reduces the need for amplification and thus reduces the noise of the transmission link, which in turn reduces the required signal power for a given required OSNR. However, reducing the attenuation of the optical fiber impacts the optical fiber transmission system in a different way than by changing the effective area $A_{\it eff}$, so that these two parameters cannot be exactly traded off.

What is needed therefore is a more robust type of large-effective-area optical fiber that reduces adverse non-linear effects while also having sufficiently small bending loss.

SUMMARY

According to a first embodiment of the present disclosure, a quasi-single-mode (QSM) optical fiber includes a core and a cladding surrounding the core. The core includes a centerline and an outer edge. The cladding includes an interior edge and an exterior edge. The cladding has a cladding outer diameter defined by the exterior edge of the cladding. The cladding outer diameter may be in the range of greater than 170 µm to about 200 µm. The QSM fiber has a cabled cutoff wavelength that is greater than about 1530 nm. The core and the cladding support a fundamental mode $LP_{01}$ and a higher-order mode $LP_{11}$. The fundamental mode $LP_{01}$ has an effective area $A_{\it eff} > 150$ µm².

According to a second embodiment of the present disclosure, a quasi-single-mode (QSM) optical fiber includes a core and a cladding surrounding the core. The core has a centerline and an outer edge. The cladding has an interior edge and an exterior edge. The QSM fiber has a cabled cutoff wavelength that is greater than about 1530 nm. The core and the cladding support a fundamental mode $LP_{01}$ and a higher-order mode $LP_{11}$. The fundamental mode $LP_{01}$ has an effective area $A_{\it eff} > 150$ µm². The core and the cladding have a multi-path interference of less than about $-30$ dB per 100 km.

According to a third embodiment of the present disclosure, a quasi-single-mode (QSM) optical fiber includes a core and a cladding surrounding the core. The core has a centerline and an outer edge. The cladding has an interior edge and an exterior edge. The cladding has a cladding outer diameter defined by the exterior edge of the cladding. The cladding outer diameter is in the range of greater than 170 µm to about 200 µm. The fiber has a cabled cutoff wavelength that is greater than about 1530 nm. The core and the cladding support a fundamental mode $LP_{01}$ and a higher-order mode $LP_{11}$. The fundamental mode $LP_{01}$ has an effective area $A_{\it eff} > 150$ µm². The core and the cladding have a multi-path interference of less than about $-30$ dB per 100 km.

In embodiments of the foregoing embodiments the core may have a peak refractive index no on the centerline and a refractive index $n_1$ at the outer edge. In some embodiments the cabled cutoff is less than about 2000 nm. In embodiments the cladding includes an inner annular moat region that is immediately adjacent to the core. According to some embodiments the core and the cladding have a bending loss BL<0.02 dB/turn at 1625 nm for a bend diameter, $D_B$, that is equal to 60 mm. According to further embodiments a high-index ring begins at a radius of at least about 40 µm from the centerline of the core. In some embodiments the high-index ring may have a refractive index change in the range of at least about 0.0005 to less than about 0.0022.

DETAILED DESCRIPTION

Figure 1:
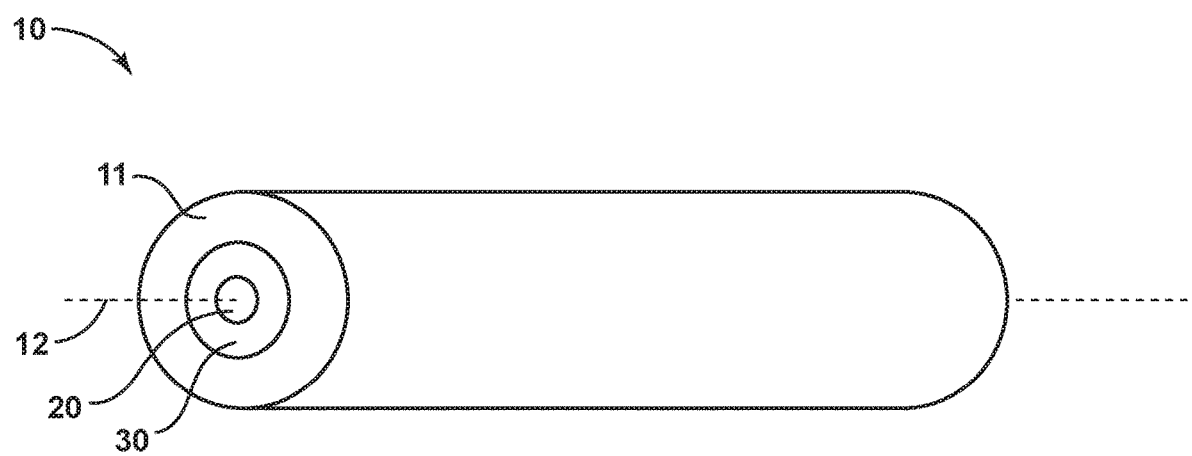
FIG. 1 is a front elevated view of a section of quasi-single-mode (QSM) fiber as disclosed herein.

Reference will now be made in detail to the present preferred embodiments, examples of which are illustrated in the accompanying drawings. Whenever possible, the same reference numerals will be used throughout the drawings to refer to the same or like parts.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key embodiments of the disclosure.

The claims as set forth below are incorporated into and constitute part of this Detailed Description.

Terminology

The term "relative refractive index," as used herein in connection with the multimode fibers and fiber cores discussed below, is defined as:

$$\Delta(r)=[n(r)^2-n_S^2]/(2n_S^2)$$

where n(r) is the refractive index at radius r, unless otherwise specified and $n_S$ is the reference index. The relative refractive index is defined at the operating wavelength $λ_p$. In another embodiment, $n_S$ is the index of undoped silica ($SiO_2$). The maximum index of the index profile is denoted $n_0$, and in most cases, $n_0=n(0)$.

As used herein, the relative refractive index is represented by Δ and its values are given in units of "%," unless otherwise specified. In the discussion below, the reference index $n_{REF}$ is that for pure silica.

The term "dopant" as used herein generally refers to a substance that changes the relative refractive index of glass relative to pure (undoped) $SiO_2$ unless otherwise indicated.

The term "mode" is short for a guided mode or optical mode. A "multimode" optical fiber means an optical fiber designed to support the fundamental guided mode and at least one higher-order guided mode over a substantial length of the optical fiber, such as 2 meters or longer. A "single-mode" optical fiber is an optical fiber designed to support a fundamental guided mode only over a substantial length of the optical fiber, such as 2 meters or longer. A "few mode" or "few-moded" optical fiber is an optical fiber designed to support a fundamental guided mode and one or two higher-order modes over a substantial length of the optical fiber, such as 2 meters or longer. A "quasi-single mode" fiber is distinguished from a "few-mode" fiber in that the former seeks to use only the fundamental mode to carry information while the latter seeks to use all of the few modes to carry information.

The theoretical fiber cutoff wavelength, which may alternatively be referred to as the theoretical fiber cutoff or theoretical cutoff, for a given mode is denoted $λ_0$ and is the wavelength above which guided light cannot propagate in that mode. A mathematical definition can be found in Single Mode Fiber Optics, Jeunhomme, pp. 39-44, Marcel Dekker, New York, 1990, which is hereby incorporated by reference in its entirety, wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard two meter (2 m) fiber cutoff test, as described in FOTP-80 (EIA-TIA-455-80), to yield the fiber cutoff wavelength, also known as the 2m fiber cutoff or measured cutoff. The FOTP-80 standard test is performed to either strip out the higher order modes using a controlled amount of bending or to normalize the spectral response of the fiber to that of a multimode fiber.

The cabled cutoff wavelength, or cabled cutoff, as used herein is denoted $\lambda_C$ and refers to the 22 m cabled cutoff test described in the EIA-445 Fiber Optic Test Procedures, which are part of the EIA-TIA Fiber Optics Standards. EIA-TIA is an acronym for the Electronics Industry Alliance—Telecommunications Industry Association.

The cable cutoff wavelength measurement is designed to emulate the cutoff wavelength in a cable environment. The cable cutoff wavelength is typically shorter than the fiber cutoff wavelength. For example, the cable cutoff is typically more than 100 nm shorter than the fiber cutoff Single mode optical fiber products are specified with cable cutoff below the operating wavelength to endure single mode operation. The present disclosure uses the cable cutoff to define or differentiate single mode fiber from quasi-single mode fiber. For single mode fibers, the cable cutoff is below 1530 nm, whereas for quasi-single mode fibers, the cable cutoff is above 1530 nm.

For examples of the QSM fiber disclosed herein, the cutoff wavelength, $\lambda_c$, may be greater than about 1530 nm, greater than about 1550 nm, greater than about 1600 nm, greater than about 1700 nm, greater than about 1750 nm, greater than about 1800 nm, and/or combinations or ranges thereof. For example, the cable cutoff may be in the range of about 1550 nm to about 1800 nm.

The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62,no. 1, p. 2663, February 1983). The light traveling in an optical fiber is usually described (approximately) in terms of combinations of LP (linear polarization) modes. The $LP_{0p}$ modes with p>0 have two polarization degrees of freedom and are two-fold degenerate. The $LP_{mp}$ modes with m>0, p>0 have both two polarization and two spatial degrees of freedom. They are four-fold degenerate. In the discussion herein, polarization degeneracies are not counted when designating the number of LP modes propagating in the fiber. For example, an optical fiber in which only the $LP_{01}$ mode propagates is a single-mode fiber, even though the $LP_{01}$ mode has two possible polarizations. A few-mode (or "few moded") optical fiber in which the $LP_{01}$ and $LP_{11}$ modes propagate supports three spatial modes but nevertheless is referred herein as having two modes for ease of discussion.

As used herein, the "effective area" $A_{eff}$ of an optical fiber is the cross-sectional area of the optical fiber through which light is propagated and is defined as:

$$A_{eff} = 2\pi \frac{\left(\int_0^\infty E^2 r dr\right)^2}{\int_0^\infty E^4 r dr},$$

where E is the electric field associated with light propagated in the fiber and r is the radius of the fiber. The effective area $A_{eff}$ is determined at a wavelength of 1550 nm, unless otherwise specified.

Macrobend performance of the example QSM fibers disclosed herein was determined consistent with the FOTP-62 (IEC-60793-1-47), using a mandrel having a diameter $D_B$ (e.g., $D_B$=60 mm) and measuring or computing the increase in attenuation due to the bending.

In the discussion below, any portion of the optical fiber that is not the core is considered part of the cladding, which can have multiple sections. In some of the Figures (e.g., FIG. 1 and FIG. 4), the cladding is shown has having a limited radial extent (e.g., out to radius $r_g$) for ease of illustration even though the cladding in principle extends beyond this limit.

The C-band is defined as the wavelength range from 1530 nm to 1565 nm; The L-band is defined as the wavelength range from 1565 nm to 1625 nm; and the C+L wavelength band is defined as the wavelength range from 1530 nm to 1625 nm.

The limits on any ranges cited herein are considered to be inclusive and thus to lie within the stated range, unless otherwise specified.

QSM Optical Fiber

FIG. 1 is an elevated view of a section of a QSM fiber 10 as disclosed herein. The QSM fiber 10 has a body 11 configured as described below and includes a centerline 12 that runs longitudinally down the center of the QSM fiber 10.

Figure 2:
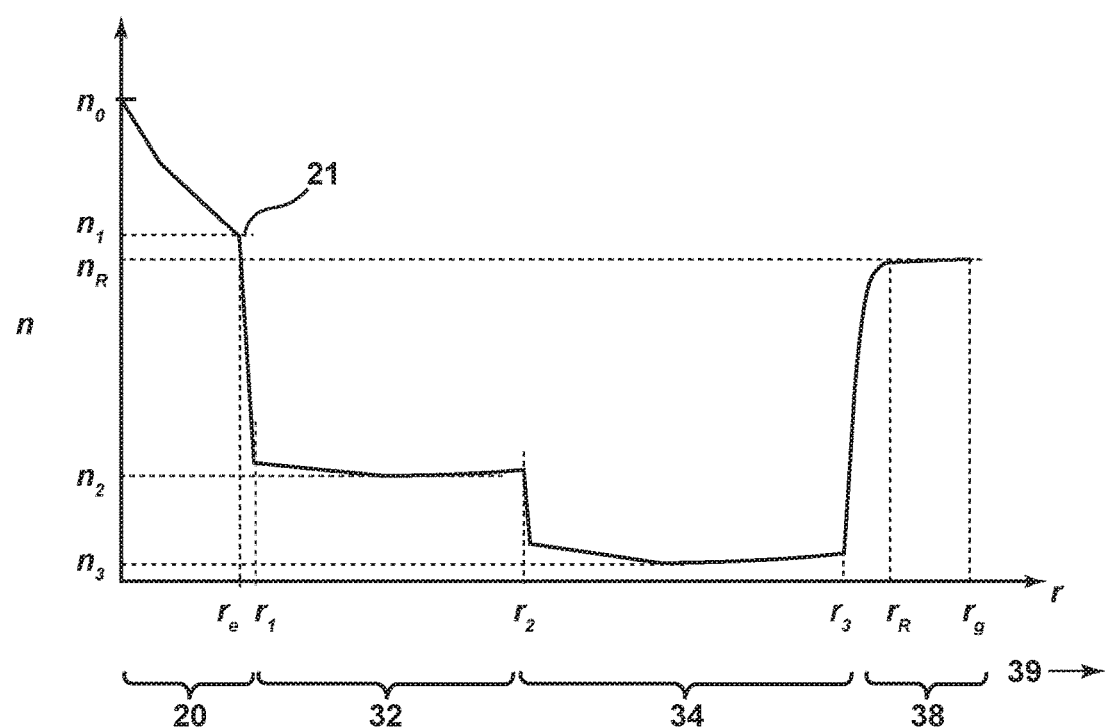
FIG. 2 is a plot of the refractive index n versus radius r that illustrates an example refractive index profile for an example of the QSM fiber of FIG. 1.

FIG. 2 is a plot of the refractive index n versus radius r of QSM fiber 10 as measured from centerline 12, illustrating an example refractive index configuration (profile) for the QSM fiber 10. The QSM fiber 10 has a central core ("core") 20 with a cladding 30 surrounding the core 20. In an example, core 20 is made primarily of silica and preferably alkali doped, e.g., potassium doped silica. Core 20 is preferably substantially free, and preferably entirely free, of $GeO_2$. Core 20 may also include fluorine as a dopant.

The cladding 30 includes a number of regions, namely a first inner annular cladding region or "inner cladding" 32, a second inner annular cladding region or "moat" 34 surrounding the inner cladding, and an annular outer cladding region or "ring" 38 surrounding moat 34. The shape of the core 20 is approximately triangular, but can vary from a step profile to an alpha profile. The core 20 has an outer edge 21 at a radius $r_e$, which can be considered the core radius, which in example is also equal to radius $r_1$. In one example, the core radius $r_e$ or $r_1$>5 μm, while in another example, $r_e$ or $r_1$>7 μm.

In an example, neither the core 20 nor the cladding 30 includes germanium. The different regions of cladding 30 may be made of fluorine-doped silica. In an example, cladding 30 is doped with fluorine while core 20 is doped with potassium.

The example refractive index profile of the example QSM fiber 10 of FIG. 2 can be described by nine fiber parameters (P): Five refractive indices $n_0$, $n_1$, $n_2$, $n_3$ and $n_R$, and four radii $r_1$, $r_2$, $r_3$ and $r_R$. The refractive index no is the peak refractive index and occurs at r=0, i.e., on centerline 12 within core 20. The refractive index $n_1$ represents the refractive index at the interface between the core 20 and the adjacent inner cladding 32, i.e., at the core edge 21, which in an example is associated with radius $r_e$. The refractive index $n_2$ represents the minimum refractive index for inner cladding 32. The refractive index $n_3$ represents the minimum refractive index for moat 34. The refractive index $n_R$ represents the refractive index of ring 38.

In an example, the radius $r_1$ represents both the radius of core 20 and the inner radius of inner cladding 32, while the radius $r_2$ represents the outer radius of the inner cladding. The radius $r_3$ represents the outer radius of moat 34. The radius $r_R$ represents the inner radius of ring 38. The radius $r_g$ represents the radius where ring 38 ends and the glass coating 39 of refractive index $n_g$ that makes up the rest of the QSM fiber 10 begins.

Figure 5A:
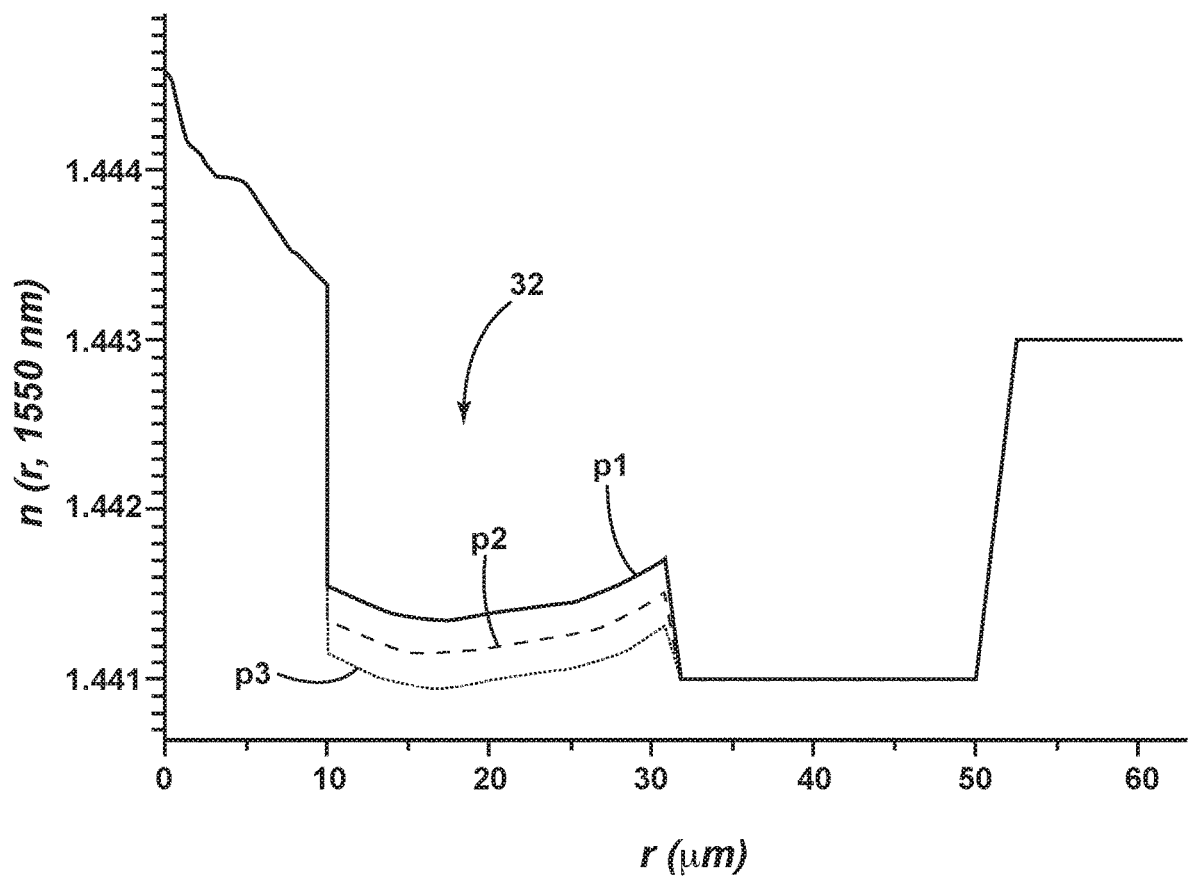
FIG. 5A is similar to FIG. 2 and illustrates in a single plot three different refractive index profiles p1, p2 and p3 for example QSM fibers, wherein the inner cladding for the different profiles has different depths.

In an example, the nine fiber parameters P are designed for a nominal glass radius $r_g$=62.5 μm. Small adjustments, to especially the cladding parameters ($r_3$, $n_3$) and ring parameters ($n_R$, $r_R$) may be required if the fiber glass radius $r_g$ is changed, which is optional for reducing bending loss (e.g., macro- and/or microbending loss). In FIG. 2, the core edge radius $r_e$ is slightly smaller than the inner cladding radius $r_1$ due to shortcomings in the refractive index measurement. In the plot of FIG. 5A discussed below, the transition from core 20 to inner cladding 32 is vertical so that $r_e=r_1$.

In an example embodiment of QSM fiber 10, $n_0 > n_1 > n_3 > n_2$. In another example, $n_1 > n_R$, while another example $n_1 \le n_R$. Also in an example, $n_R > n_3 > n_2$.

Figure 3:
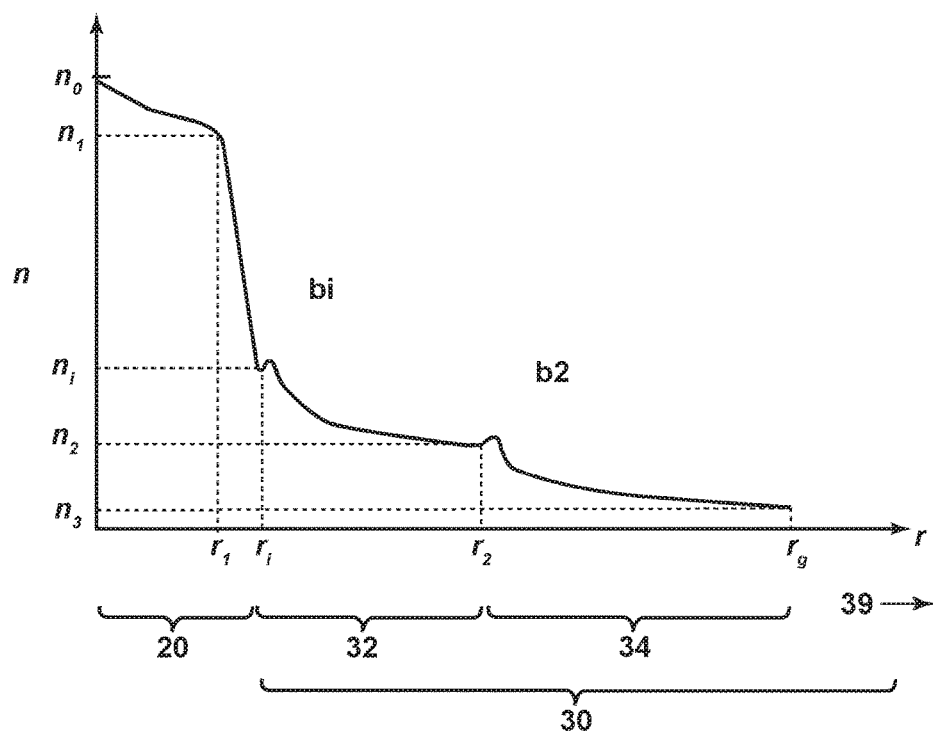
FIG. 3 is similar to FIG. 2 and illustrates an example refractive index profile for the QSM fiber that does not include the ring portion of the cladding section.

FIG. 3 is similar to FIG. 2 and illustrates an example refractive index profile for an example QSM fiber 10 wherein the cladding region 30 does not include the outer ring 38. For the "no-ring" profile of FIG. 3, the inner radius of inner cladding 32 is denoted $r_1$ and has an associated refractive index $n_1$. The shape of the core 20 is approximately step-like in the example, but can vary from a step profile to an alpha profile. The small bumps b1 and b2 in the refractive index profile of FIG. 3 are features arising from the expected draw stress distribution and are not critical to the design. As noted above, the inner radius $r_1$ of inner cladding 32 can be equal to the radius $r_1$ of core 20.

The QSM fiber 10 disclosed herein has a relatively large effective area $A_{eff}$, which in one example is $A_{eff} > 150$ μm², while in another example is $A_{eff} > 170$ μm², while yet in another example is $A_{eff} > 180$ μm², while is still another example $A_{eff} > 200$ μm². The QSM fiber 10 is designed to be operated using only the fundamental mode $LP_{01}$ just as in single-mode fiber, while the one additional higher-order mode $LP_{11}$ is not used. The one additional higher-order mode $LP_{11}$ can impair the transmission of optical signals traveling in the QSM fiber unless appropriate MP-compensating digital signal processing is applied to the received (transmitted) signal.

In an example, the fundamental mode $LP_{01}$ has a fundamental-mode effective index, the higher-order mode $LP_{11}$ has a higher-order-mode effective index, and wherein a difference $\Delta n_{eff}$ between the fundamental-mode effective index and the higher-order-mode effective index is $|\Delta n_{eff}| > 0.001$ at a wavelength of 1550 nm.

Higher-Order-Mode Impairments

The main two impairments caused by the presence of the higher-order mode $LP_{11}$ in QSM fiber 10 are multipath interference (MPI) and excess loss (EL). An embodiment of the disclosure includes using QSM fiber 10 for optical signal transmission while electronically mitigating MPI of the optical signal using digital signal processing techniques that are known in the art and as described in greater detail. The electronic mitigation of MPI effects enables the deployment of QSM fiber 10 in an optical transmission system. To this end, in an example, the aforementioned parameters P of QSM fiber 10 are substantially optimized, while the excess loss EL, which cannot be compensated, is substantially minimized (e.g., made substantially zero). This avoids having the excess loss EL reduce the benefit of having a relatively large effective area $A_{eff}$ used to overcome detrimental non-linear effects, as explained above.

MPI is defined as the ratio of the total power in the crosstalk terms to the total power in the signal as described in Equation 5 of Mlejnek et al, IEEE Photonics Journal, vol. 7, no. 1, article 7100116, (2015), which is hereby incorporated by reference in its entirety. Examples of MPI measurement techniques for QSM fibers are described in Downie et al, IEEE Photonics Conference, paper MG3.4, (2015), which is hereby incorporated by reference in its entirety. In various examples, the multi-path interference of the core 20 and the cladding 30 may be less than about −20 dB per 100 km, less than about −30 dB per 100 km, less than about −40 dB per 100 km, less than about −50 dB per 100 km, and/or combinations or ranges thereof.

While in some cases it may be possible to mitigate impairments caused by MPI using digital signal processing (DSP) techniques, when signals are processed the complexity, cost, and power consumption of the system increases. Accordingly, there is a need for QSM fibers 10 that can mitigate MPI such that the desire for, and use of, digital signal processing is substantially decreased or eliminated. MPI arises from coupling that occurs back and forth between the fundamental mode and the higher-order-mode during propagation of light within the fiber 10. Even if the optical signal is launched only into the fundamental mode at the beginning of an optical span between amplifiers, mode coupling during propagation will occur. The different modes of the QSM fiber 10 will likely have different group velocities. Therefore, coupling of small fractions of the fundamental mode out to the higher-order-mode and then further small coupling back into the fundamental mode from the higher-order-mode further along the length of the fiber 10 often create weak copies of the main signal with different delays at the receiver compared to the main signal. The presence of these weak delayed copies of the signal interferes with the main signal and degrades the received signal quality. Furthermore, a majority of light coupled out of the fundamental mode tends to result in a greater effective attenuation of the fiber 10 than a pure single-mode fiber because any light still in the higher order modes at the end of a span of the fiber 10 is lost as the fiber 10 is often spliced or coupled to a single-mode fiber prior to being amplified.

Given the deleterious nature of mode coupling, or MPI, in transmission using QSM fibers 10, it is desirable to minimize MPI as much as possible. Mode coupling can occur at splice points between fiber segments as well as from microbending in the fiber during propagation. Of these two sources, distributed mode coupling arising from microbending in the fiber is likely to be the more dominant source of MPI and excess loss. Microbending loss is influenced by the fiber index profile in that microbending loss generally varies inversely with the difference $\Delta n_{eff}$ between the phase indexes of the $LP_{01}$ mode and the higher-order-mode, $LP_{11}$. Microbending loss is also a function of the overlap integrals between the $LP_{01}$ and $LP_{11}$ modes. Therefore, microbending loss can be controlled to some extent via the index profile design of the fiber 10. However, for a given profile design that satisfies other requirements such as effective area $A_{eff}$, the level of mode coupling may still be higher than desired in terms of MPI generation and excess loss. Accordingly, the QSM fiber 10 may be produced with a suitable refractive index profile, effective area $A_{eff}$, cutoff wavelength, etc. while still having an unacceptable level of MPI generation that renders the fiber 10 undesirable for use in long-haul and/or submarine applications. For example, the fiber 10 may show an unacceptable level of MPI generation due to higher sensitivity to the deployment conditions.

Because the higher-order mode $LP_{11}$ of QSM fiber 10 is undesirable and unused, the design and configuration of the QSM fiber 10 is different than that for conventional few-mode optical fibers that seek to transmit information in the higher-order modes. In particular, because conventional few-mode optical fibers seek to utilize the information transmitted in the few higher-order modes, these modes need to have relatively low differential modal attenuation (DMA). As is explained in greater detail below, the QSM fiber 10 disclosed herein has relatively high DMA, i.e., the higher-order mode $LP_{11}$ is intentionally subjected to a relatively large attenuation to reduce the degree of optical transmission impairment caused by this higher-order mode.

Ideally, QSM fiber 10 would have a relatively large phase index difference between all supported modes to minimize mode-coupling, while at the same time having a small group index difference between all supported modes. This latter attribute minimizes the digital signal processing required to remove MPI artifacts from the received signal. Unfortunately, this is not possible in fibers with large effective area $A_{eff}$. Qualitatively, this is because, for any mode, the group index ($n_g$) is related to phase index (or "effective index" $n_e$) as follows:

$$n_g = n_e - \lambda \frac{dn_e}{d\lambda}$$

The difference in the group index $n_g$ between two modes is therefore given by:

$$\Delta n_g = \Delta n_e - \lambda \Delta \frac{dn_e}{d\lambda}$$

In the limit of very large effective area $A_{eff}$, the wavelength dispersion of all modes approaches that of the bulk glass, in which case the last term in the equation for $\Delta n_g$ vanishes so that $\Delta n_g \approx \Delta n_e$. Consequently, one cannot simultaneously have a low mode coupling (large $\Delta n_e$) and a small differential mode delay (DMD, small $\Delta n_g$).

In the QSM fiber 10 disclosed herein, low mode coupling is substantially preserved while, as noted above, the DMD is managed by intentionally designing the QSM fiber to have as much loss (i.e., a high DMA) as possible for the higher-order mode $LP_{11}$. A high DMA reduces the number of equalizer taps (i.e., memory) required in the digital signal processor used for MPI compensation, thereby reducing system complexity, as described below. High DMA values also reduce the total MPI level, which may have an upper limit in terms of the efficacy of the MPI compensation digital signal processing.

In one example, the DMA for a wavelength of 1530 nm is DMA≥1.0 dB/km, while in another example, the DMA≥4.0 dB/km. Also in one example, the coupling coefficient CC between the fundamental mode $LP_{01}$ and the higher-order mode $LP_{11}$ at a wavelength of 1530 nm is CC<0.002 km$^{-1}$, while in another example, the coupling coefficient CC<0.001 km$^{-1}$.

Figure 4:
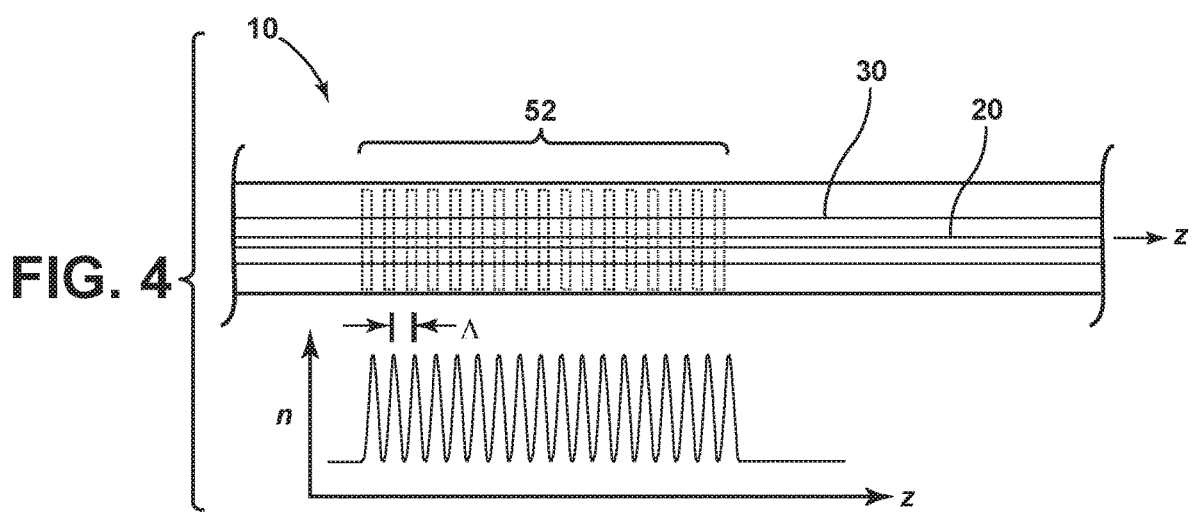
FIG. 4 is a close-up, cross-sectional view of the QSM fiber of FIG. 1, illustrating an example where the fiber includes an axial (longitudinal) refractive-index perturbation designed to provide substantial attenuation of the higher-order mode while not substantially attenuating the fundamental mode.

One way to increase the DMA for the higher-order mode $LP_{11}$ is to shift the cutoff wavelength $\lambda_c$ to its lowest possible value consistent with macrobend requirements. Another way is to make the higher-order modes lossy in a mode-selective way. FIG. 4 is a close-up cross-sectional view of a portion of an example QSM fiber 10 that includes an axial (longitudinal) refractive-index perturbation 52. FIG. 4 includes a plot of refractive index n versus the axial distance z down the QSM fiber that illustrates an example form of the refractive-index perturbation having a constant period $\Lambda$. The refractive-index perturbation 52 is configured to increase the attenuation (DMA) of the higher-order mode $LP_{11}$ while not substantially increasing the attenuation of the fundamental mode $LP_{01}$. In an example, refractive-index perturbation 52 is in the form of a long-period grating that substantially matches a difference in the effective indices of the higher-order mode $LP_{11}$ and a radiative cladding mode at the operating wavelength, i.e., a period $\Lambda \approx 1/\Delta n$, where $\Delta n$ is the effective index difference between the higher-order mode $LP_{11}$ and the radiative cladding mode).

In an example, axial refractive-index perturbation 52 has a wavelength resonance and includes a non-constant (e.g., chirped) period $\Lambda$ that serves to widen the bandwidth of the resonance as compared to the constant period configuration. In an example, axial refractive-index perturbation 52 can be formed in QSM fiber 10 using known methods, such as laser irradiation. In an example, the axial refractive-index perturbation 52 can be formed as the fiber is being drawn, such as by irradiating the fiber 10 with one or more lasers. In an example, the period $\Lambda$ of the refractive-index perturbation is chosen such that there is substantially no resonant coupling of the $LP_{01}$ and $LP_{11}$ modes in the C+L bands, and in an example at a wavelength of 1530 nm.

The so-called "Gaussian Noise (GN)" model of optical transmission posits that the launch-power-optimized system Q-factor scales with the effective area $A_{eff}$ as:

$$Q^2 \propto A_{eff}^{2/3}$$

so that increasing the effective area $A_{eff}$ from 150 to 175 μm$^2$ increases $Q^2$ by about 11% or 0.45 dB. Increasing the effective area $A_{eff}$ from 150 to 250 μm$^2$ increases $Q^2$ by 41% or 1.5 dB. An example simulation was carried out for an erbium-doped fiber-amplified (EDFA) polarization-multiplexed (PM)-16QAM (Quadrature Amplitude Modulation) optical transmission system having 80 channels, a 32 GHz (Nyquist) channel spacing, a 50 km span length, ideal (noise and distortion-free) transmitter and receivers and a QSM fiber 10 with span loss of 0.158 dB/km. The simulation shows that increasing the effective area $A_{eff}$ from 150 μm$^2$ to 250 μm$^2$ increases the reach at 11.25 dB from 3000 km to 4000 km. Hence, while a 1.5 dB increase in optimal $Q^2$ seems small, it can lead to a significant reach improvement.

This simulation suggests that with 50 km spans, increasing the effective area $A_{eff}$ from 150 μm$^2$ to 250 μm$^2$ and increasing the span loss from 0.158 dB/km to 0.215 dB/km produces no net change in $Q^2$. Hence the excess loss EL (i.e., the additional loss resulting from mode coupling above the intrinsic $LP_{01}$ attenuation) of just 0.057 dB/km can completely erase the advantage of the increase in effective area $A_{eff}$. An excess loss EL of even 0.01 dB/km can decrease the reach of the QSM fiber 10 with an effective area $A_{eff}$=250 μm$^2$ by about 200 km. The advantage of large effective area fibers with an effective area $A_{eff}$ of less than 250 μm$^2$ would likewise be reduced.

It was found through modeling that conventional refractive index profiles cannot achieve sufficiently large DMA and effective areas $A_{eff}$ exceeding 175 μm$^2$ without also introducing excess macrobend loss. However, it was also found that the judicious addition of the ring 38 of increased refractive index $n_R$ relative to the refractive index $n_c$ of the outer cladding 34 can enhance the $LP_{11}$ mode coupling to the glass coating 39, thereby increasing the DMA without significantly impacting bend performance. In this regard, the index $n_R$ of the ring 38 must not exceed the effective index $n_{eff}$ of the fundamental mode. In an example, ring 38 includes at least one absorbing dopant that contribute to the attenuation of the higher-order mode $LP_{11}$. Examples of absorbing dopants include titanium or other transition metals. In another example, ring 38 does not include any absorbing dopants. In an example, ring 38 includes fluorine dopant, which is not an absorbing dopant.

Example QSM Fibers

Table 1 below sets forth example QSM fiber parameters P for three examples of QSM fiber 10. In the Tables below, P stands for the given parameter, "MIN1" and "MAX1" stand for first example minimum and maximum values for the given parameter, "MIN2" and "MAX2" for second example minimum and maximum values for the given parameter, and "MIN3" and "MAX3" for third example minimum and maximum values for the given parameter. The parameters P in the following Tables are based on QSM fiber 10 having a nominal radius $r_g=62.5$ μm.

Table 2 below is an alternative representation of the refractive index data of Table 1. In Table 2, the refractive index change relative to pure silica is used. This refractive index change is represented by the relative refractive index Δ, which is given by $$\Delta = \frac{n^2 - n_S^2}{2n_S^2},$$

where n is the refractive index value from the tables above (at 1550 nm) and $n_S=1.444374$, the refractive index of pure silica.

The second example of QSM fiber 10 is set forth in Table 3 below and represents an example of the "no ring" configuration such as shown in FIG. 3.

The third example of QSM fiber 10 is set forth in Table 4 below and represents another example of the "no ring" configuration.

TABLE 1

EXAMPLE 1

| P | MIN0 | MAX0 | MIN1 | MAX1 | MIN2 | MAX2 |
|---|---|---|---|---|---|---|
| $n_0$ | 1.4430 | 1.4450 | 1.4436 | 1.4448 | 1.4438 | 1.4447 |
| $n_1$ | 1.4430 | 1.4450 | 1.4430 | 1.4436 | 1.4432 | 1.4434 |
| $n_2$ | 1.4400 | 1.4430 | 1.4406 | 1.4419 | 1.4408 | 1.4415 |
| $n_3$ | 1.4390 | 1.4430 | 1.4406 | 1.4422 | 1.4408 | 1.4412 |
| $r_1$ [μm] | 5 | 15 | 7 | 12 | 8 | 11 |
| $r_2$ [μm] | 25 | 38 | 28 | 35 | 31 | 33 |
| $r_3$ [μm] | 40 | 62.5 | 45 | 55 | 48 | 52 |
| $r_R$ [μm] | 40 | 62.5 | 47 | 57 | 50 | 54 |

TABLE 2

EXAMPLE 1 USING Δ VALUES

| P | MIN | MAX | MIN1 | MAX1 | MIN2 | MAX2 |
|---|---|---|---|---|---|---|
| $\Delta_0$ | −9.5082E−04 | 4.3350E−04 | −5.3573E−04 | 2.9498E−04 | −3.9733E−04 | 2.2573E−04 |
| $\Delta_1$ | −9.5082E−04 | 4.3350E−04 | −9.5082E−04 | −5.3573E−04 | −8.1248E−04 | −6.7411E−04 |
| $\Delta_2$ | −3.0237E−03 | −9.5082E−04 | −2.6095E−03 | −1.7114E−03 | −2.4714E−03 | −1.9878E−03 |
| $\Delta_3$ | −3.7137E−03 | −9.5082E−04 | −2.6095E−03 | −1.5040E−03 | −2.4714E−03 | −2.1951E−03 |
| $r_1$ [μm] | 5 | 15 | 7 | 12 | 8 | 11 |
| $R_2$ [μm] | 25 | 38 | 28 | 35 | 31 | 33 |
| $r_3$ [μm] | 40 | 62.5 | 45 | 55 | 48 | 52 |
| $r_R$ [μm] | 40 | 62.5 | 47 | 57 | 50 | 54 |

TABLE 3

EXAMPLE (NO RING)

| P | MIN | MAX | MIN1 | MAX1 | MIN2 | MAX2 |
|---|---|---|---|---|---|---|
| $n_0$ | 1.4435 | 1.4445 | 1.4437 | 1.4443 | 1.4438 | 1.4442 |
| $n_1$ | 1.4430 | 1.4450 | 1.4427 | 1.4438 | 1.4430 | 1.4435 |
| $n_i$ | 1.4410 | 1.4420 | 1.4412 | 1.4418 | 1.4413 | 1.4417 |
| $n_2$ | 1.4397 | 1.4413 | 1.4400 | 1.4412 | 1.4402 | 1.4409 |
| $n_3$ | 1.4380 | 1.4410 | 1.4387 | 1.4405 | 1.4390 | 1.4402 |
| $r_1$ [μm] | 5 | 12 | 5 | 10 | 6 | 9 |
| $r_i$ [μm] | 6 | 13 | 7 | 12 | 7 | 11 |
| $r_2$ [μm] | 18 | 33 | 19 | 29 | 20 | 25 |

TABLE 4

EXAMPLE 3 (NO RING)

| P | MIN | MAX | MIN1 | MAX1 | MIN2 | MAX2 |
|---|---|---|---|---|---|---|
| $n_0$ | 1.4435 | 1.4445 | 1.4437 | 1.4443 | 1.4438 | 1.4442 |
| $n_1$ | 1.4425 | 1.4435 | 1.4426 | 1.4433 | 1.4427 | 1.4432 |
| $n_i$ | 1.4410 | 1.4420 | 1.4412 | 1.4418 | 1.4405 | 1.4409 |
| $n_2$ | 1.4397 | 1.4413 | 1.4400 | 1.4412 | 1.4402 | 1.4409 |
| $n_3$ | 1.4380 | 1.4410 | 1.4387 | 1.4405 | 1.4390 | 1.4402 |
| $r_1$ [μm] | 6 | 14 | 6 | 12 | 7 | 10 |
| $r_i$ [μm] | 7 | 15 | 8 | 14 | 9 | 13 |
| $r_2$ [μm] | 25 | 35 | 20 | 34 | 25 | 30 |

QSM Properties of Example Profiles

Figure 6:
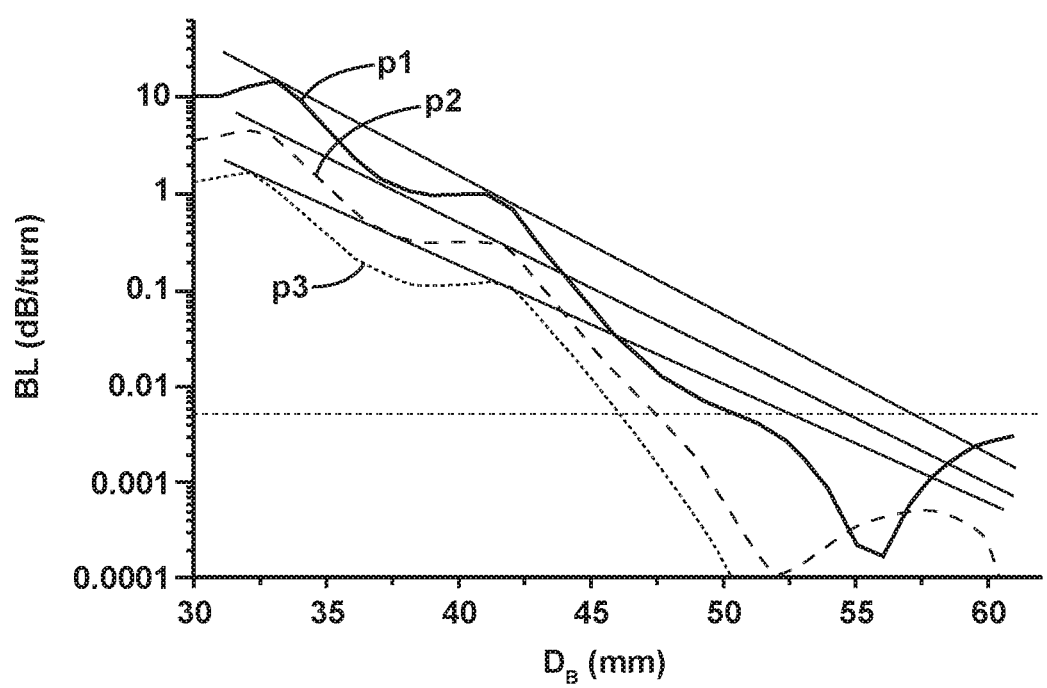
FIG. 6 is a plot of the bending loss BL (dB/turn) versus the bending diameter $D_B$ (mm) for the three refractive index profiles p1, p2 and p3 of FIG. 5A.

FIG. 5A is similar to FIG. 2 and shows first, second and third example refractive index profiles p1, p2 and p3 (solid, dashed and dotted lines, respectively) for example QSM fibers 10, wherein the different index profiles have different depths for inner cladding 32. FIG. 6 is a plot of the predicted bend loss BL (dB/turn) versus bend diameter $D_B$ (mm) at a wavelength of 1625 nm as obtained using optical modeling. The three solid straight lines in FIG. 5A are approximate upper bounds for the example profiles p1, p2 and p3 based on fitting the oscillation peaks. All three example profiles p1, p2 and p3 yield a bending loss BL<5 mdB/turn at a bend diameter $D_B$ of 60 mm.

Figure 5B:
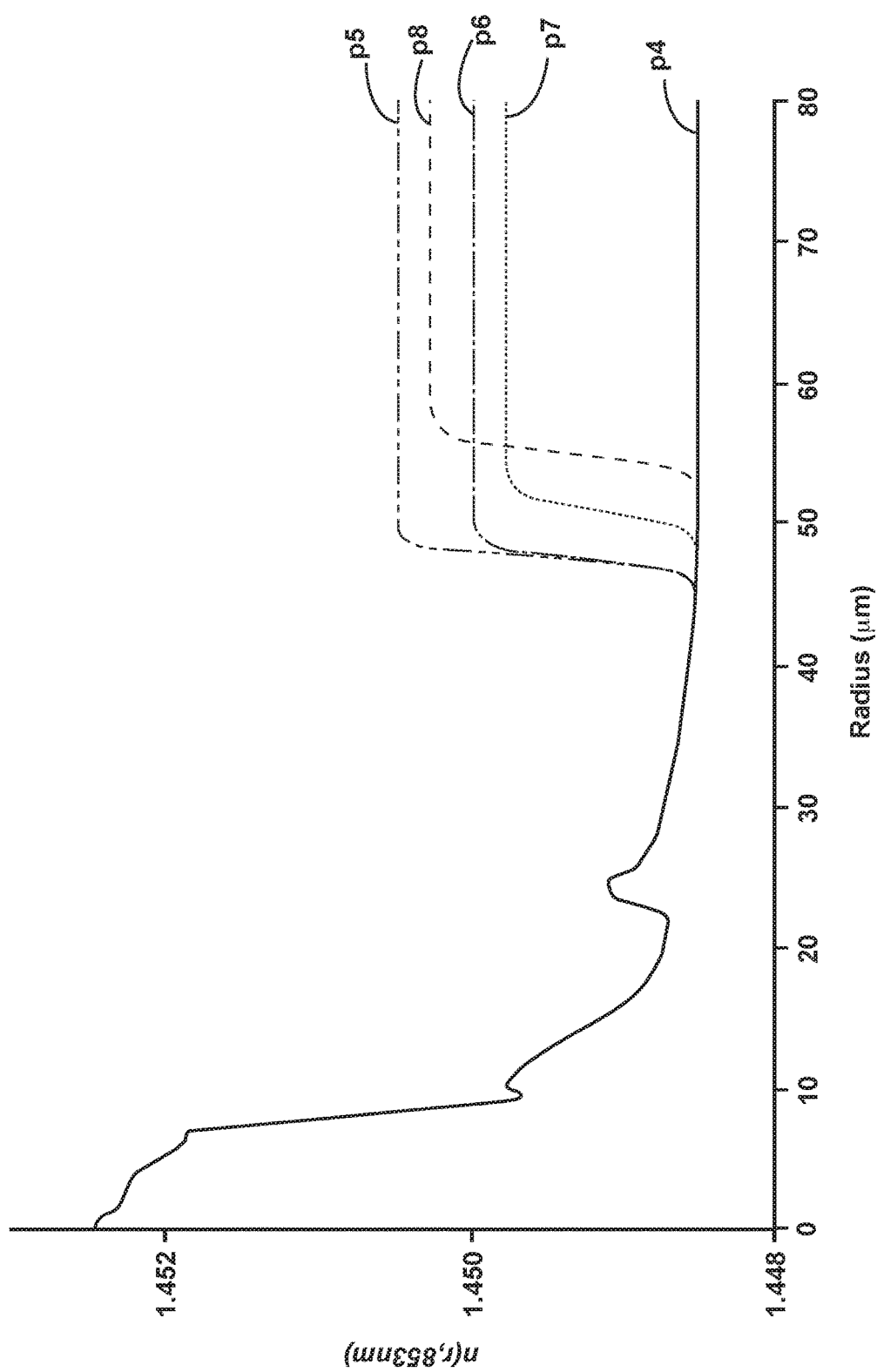
FIG. 5B is similar to FIG. 3 and illustrates in a single plot five different refractive index profiles p4, p5, p6, and p7 for example QSM fibers.

FIG. 5B is similar to FIG. 3 and shows fourth, fifth, sixth, seventh, and eighth example refractive index profiles p4, p5, p6, p7, and p8 (solid, double dot dashed, single dot dashed, dotted, and dashed, respectively). In general, these example refractive index profiles of the QSM optical fiber 10 are associated with QSM optical fibers 10 that have a cladding outer diameter that is greater than 125 μm, a large effective area $A_{eff}$ that is greater than 150 μm² for the $LP_{01}$ mode, and a cladding radius of between about 70 μm and about 100 μm. The QSM optical fibers 10 shown here may further include a high-index ring at the interface between the cladding 30 and a coating layer that surrounds the exterior edge of the cladding 30. In embodiments, the high-index ring begins at a radius of between at least about 40 µm to less than about 55 µm. In some embodiments, the refractive index change, Δ, of the high-index ring relative to the cladding 30 is in the range of at least about 0.0005 to less than about 0.0022. The high-index ring is designed to reduce the cutoff wavelength and manage MPI by affecting the attenuation or loss of the $LP_{11}$ mode. With the high-index ring, the $LP_{11}$ mode may couple into one or more ring modes in the region of the high-index ring at which point the $LP_{11}$ mode may be stripped out or removed by the coating materials.

Figure 7A:
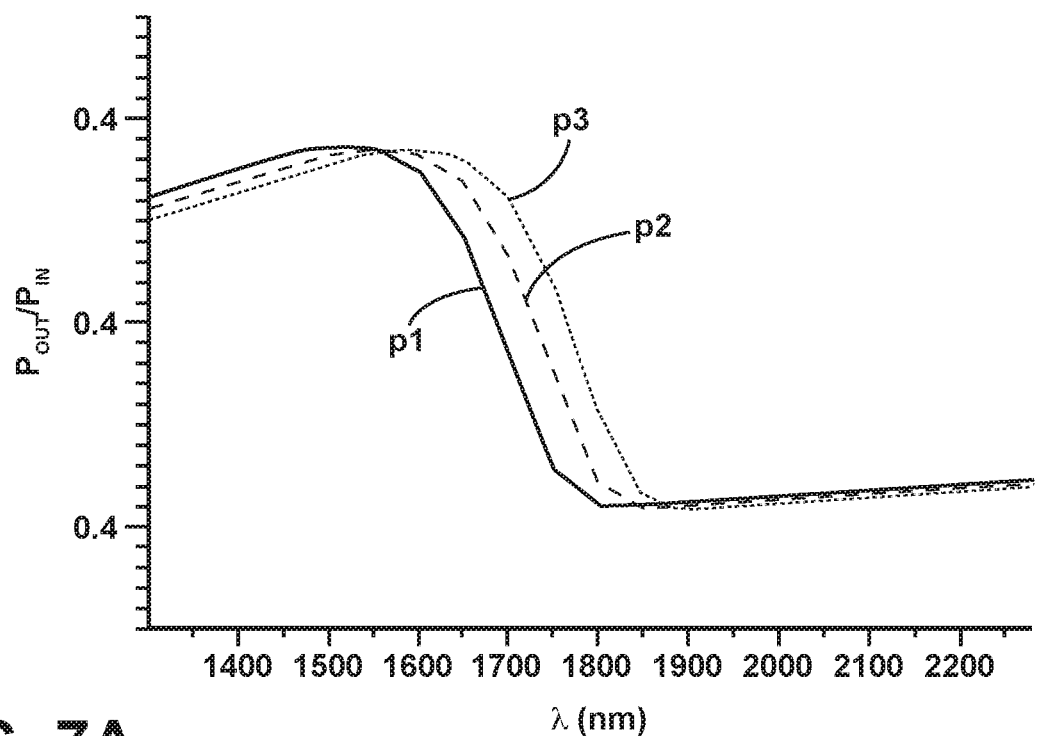
FIG. 7A is a plot of the ratio of the measured outputted optical power $P_{OUT}$ to the inputted optical power $P_{IN}$ ($P_{OUT}/P_{IN}$) versus the wavelength λ (nm) for the three different refractive index profiles p1, p2 and p3 of FIG. 5A, wherein the plot is used to calculate the cutoff wavelength $λ_c$ from multimode to single-mode operation.

FIG. 7A is a plot of the ratio of the measured outputted optical power $P_{OUT}$ to the inputted optical power $P_{IN}$ ($P_{OUT}/P_{IN}$) versus the wavelength λ (nm) for the three different refractive index profiles p1, p2 and p3 of FIG. 5A, wherein the plot is used to calculate the cutoff wavelength $α_c$ from multimode to single-mode operation.

Figure 7B:
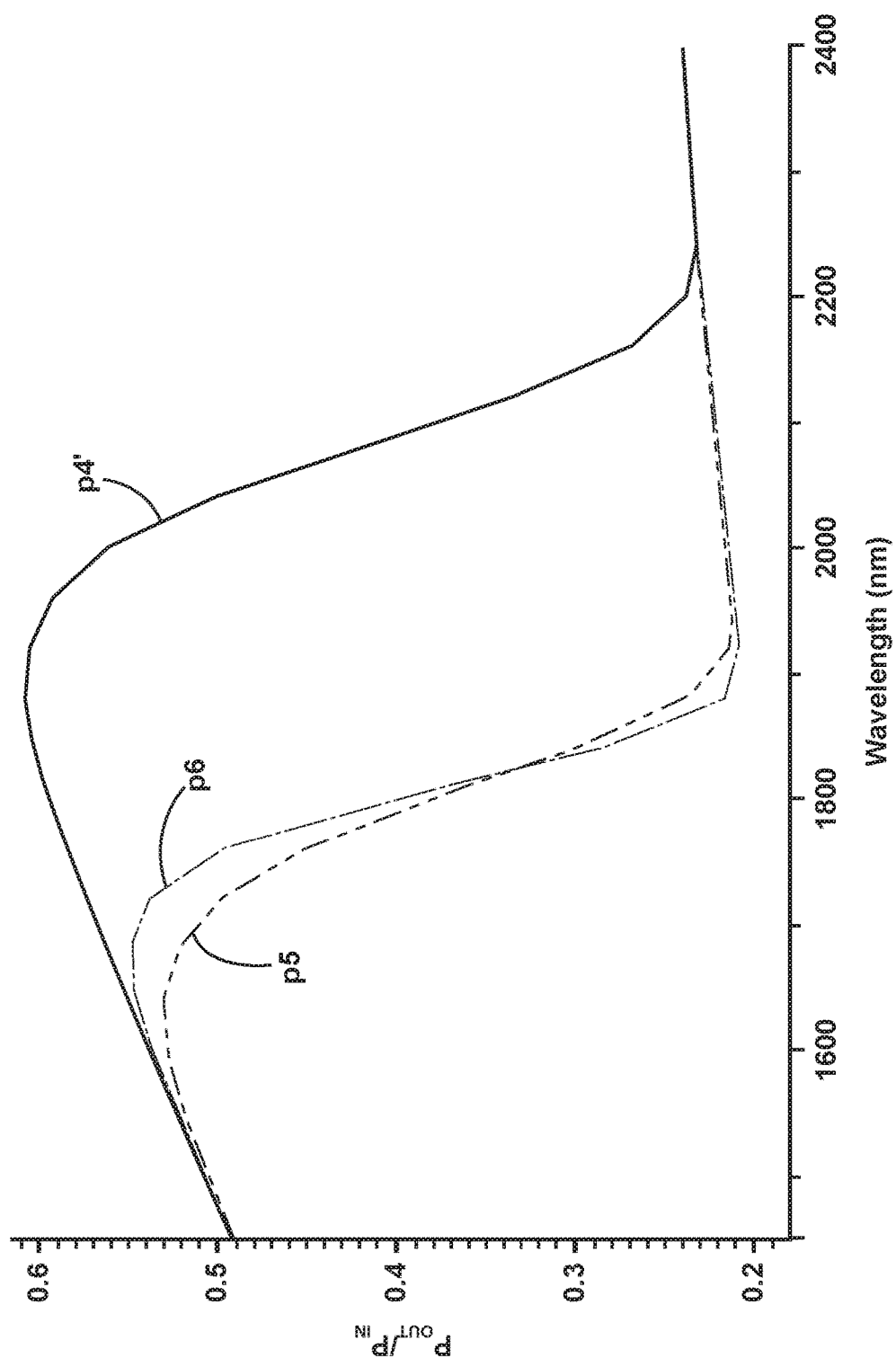
FIG. 7B is a plot of the ratio of the measured outputted optical power $P_{OUT}$ to the inputted optical power $P_{IN}$ ($P_{OUT}/P_{IN}$) versus the wavelength λ (nm) for the refractive index profiles p5 and p6 of FIG. 5B, as well a modified form of p4 of FIG. 5B that is labeled p4' and has a reduced cladding radius relative to the p4 profile, wherein the plot is used to calculate the cutoff wavelength $λ_c$ from multimode to single-mode operation.

FIG. 7B is a plot of the ratio of the measured outputted optical power $P_{OUT}$ to the inputted optical power $P_{IN}$ ($P_{OUT}/P_{IN}$) versus the wavelength λ (nm) for the refractive index profiles p5 and p6 of FIG. 5B. The curve labeled p4' corresponds to profile p4 of FIG. 5B, modified by reducing the cladding radius to a value of 62.5 µm. The plot shown in FIG. 7B may be used to calculate the fiber cutoff wavelength $λ_c$ from multimode to single-mode operation. FIG. 5B shows examples of the fiber 10 with an extended cladding radius. FIG. 7B shows the corresponding cutoff traces for the examples p5 and p6 depicted in FIG. 5B. The addition of the high-index ring leads to a reduced fiber cutoff wavelength λc for the fiber 10. A comparison of the cutoff traces shown in FIG. 7B to those of the fibers 10 without the extended cladding radius (FIG. 7A) shows that the high-index ring is effective in decreasing the fiber cutoff wavelength λc to approximately the same range in both cases.

Table 5 below summarizes the predicted optical properties of the three example profiles p1, p2 and p3 of FIG. 5A. The values for the bending loss BL are obtained from the straight-line fits of FIG. 6 while the cutoff wavelengths $λ_c$ are estimated from the power trace plots of FIG. 7A. The effective area $A_{eff}$ is measured in µm² at λ=1550 nm. The straight fiber $LP_{11}$ mode cutoff wavelength $λ_c$ is measured in nanometers (nm). The straight-fiber $LP_{11}$ mode radiative loss at 1550 nm is denoted RL and is measured in dB/km. The fundamental mode macro-bend loss BL is measured in dB/turn at λ=1625 nm and a bend diameter $D_B$=60 mm.

TABLE 5

PREDICTED OPTICAL PROPERTIES FOR 3 EXAMPLE PROFILES

| Profile | $A_{eff}$ [µm²] | Fiber Cutoff $λ_c$ [nm] | Cabled Cutoff [nm] | RL [dB/km] | BL [dB/turn] |
|---|---|---|---|---|---|
| p1 | 237 | 1800 | 1643 | 11.4 | $1.9 \times 10^{-3}$ |
| p2 | 232 | 1850 | 1658 | 5.1 | $0.9 \times 10^{-3}$ |
| p3 | 227 | 1885 | 1660 | 2.3 | $0.6 \times 10^{-3}$ |

Figure 8A:
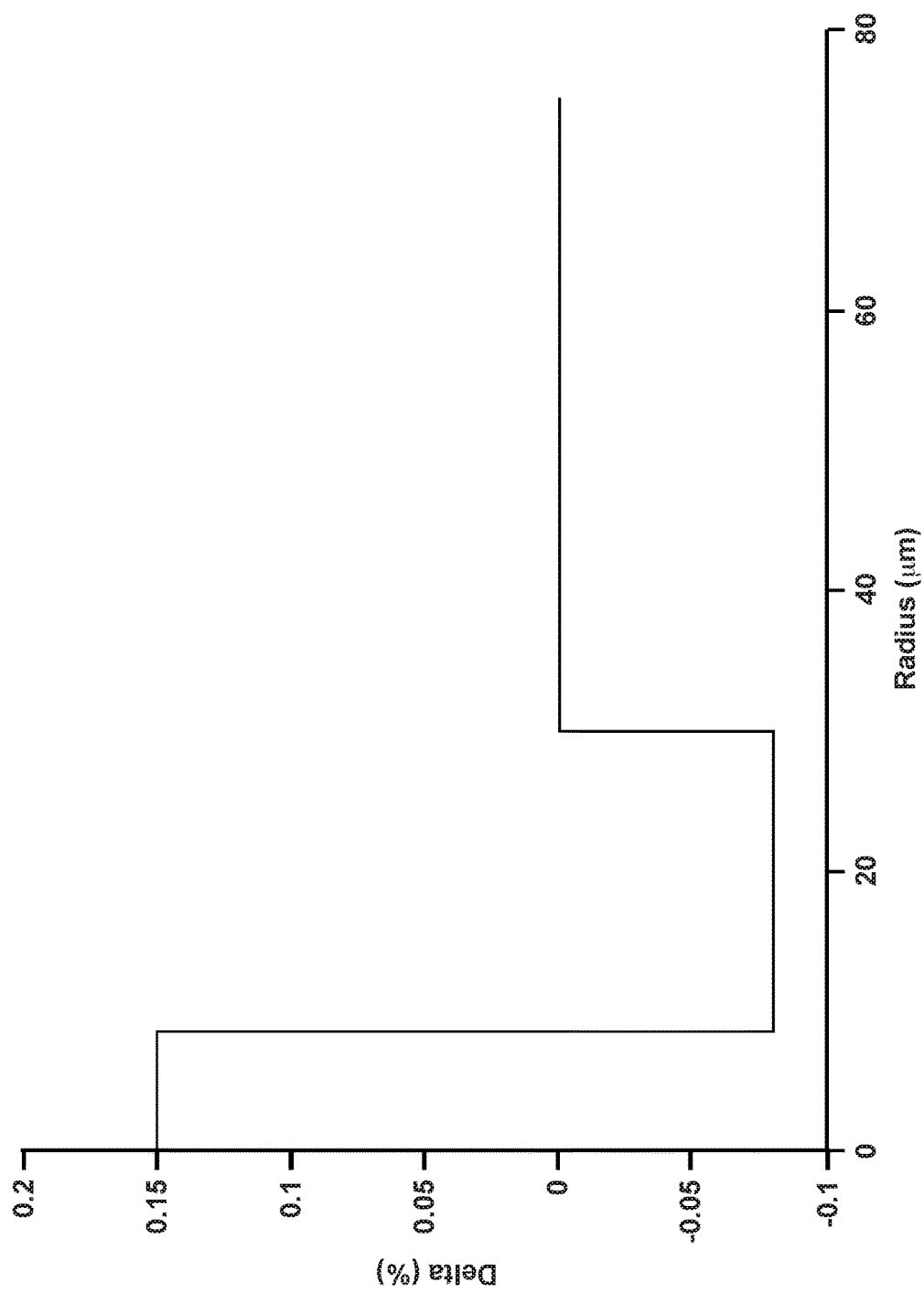
FIGS. 8A-8D are plots of refractive index, Delta, versus radius, r, that illustrate example refractive index profiles of the QSM fiber of FIG. 1, according to various embodiments.
Figure 8B:
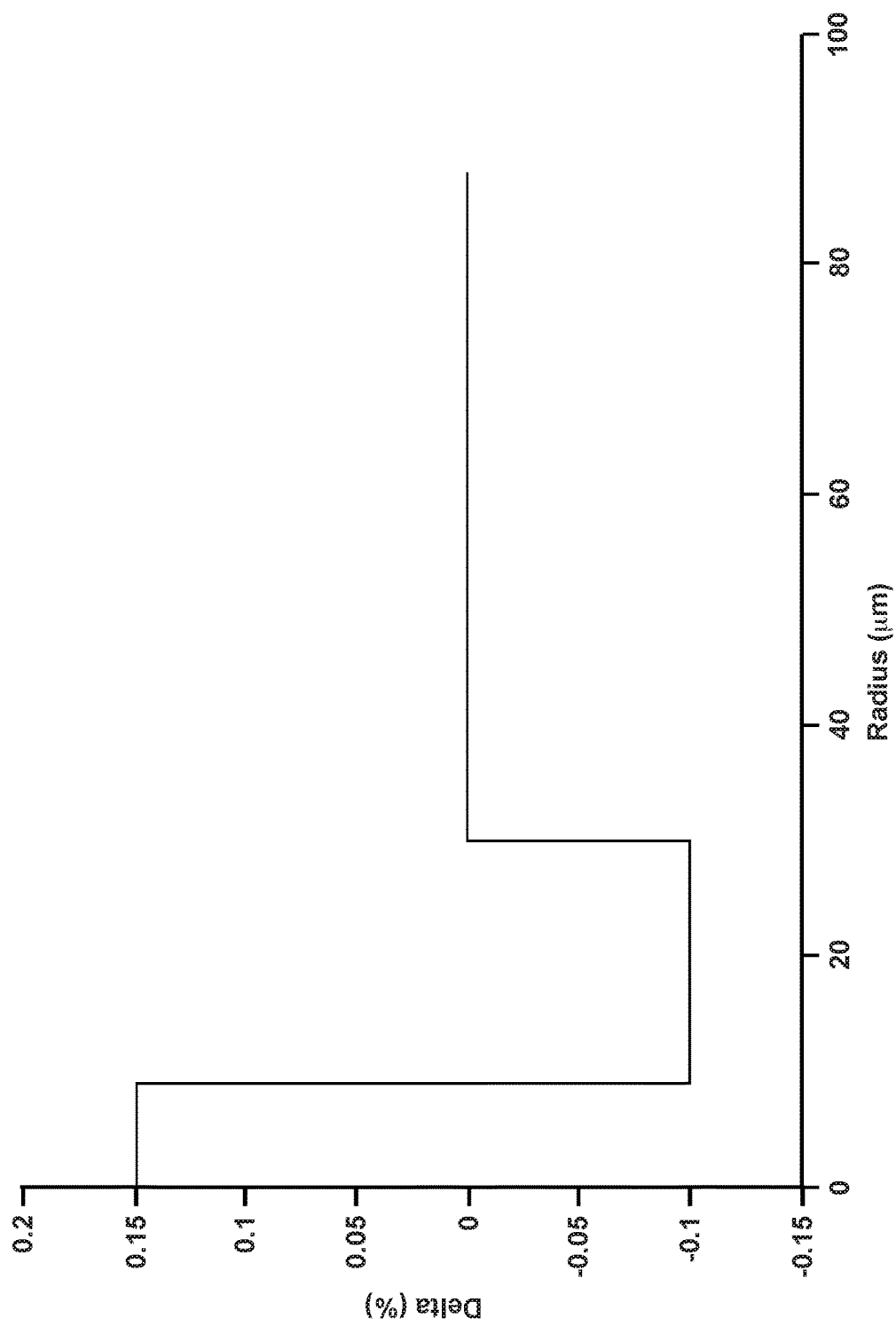
Figure 8C:
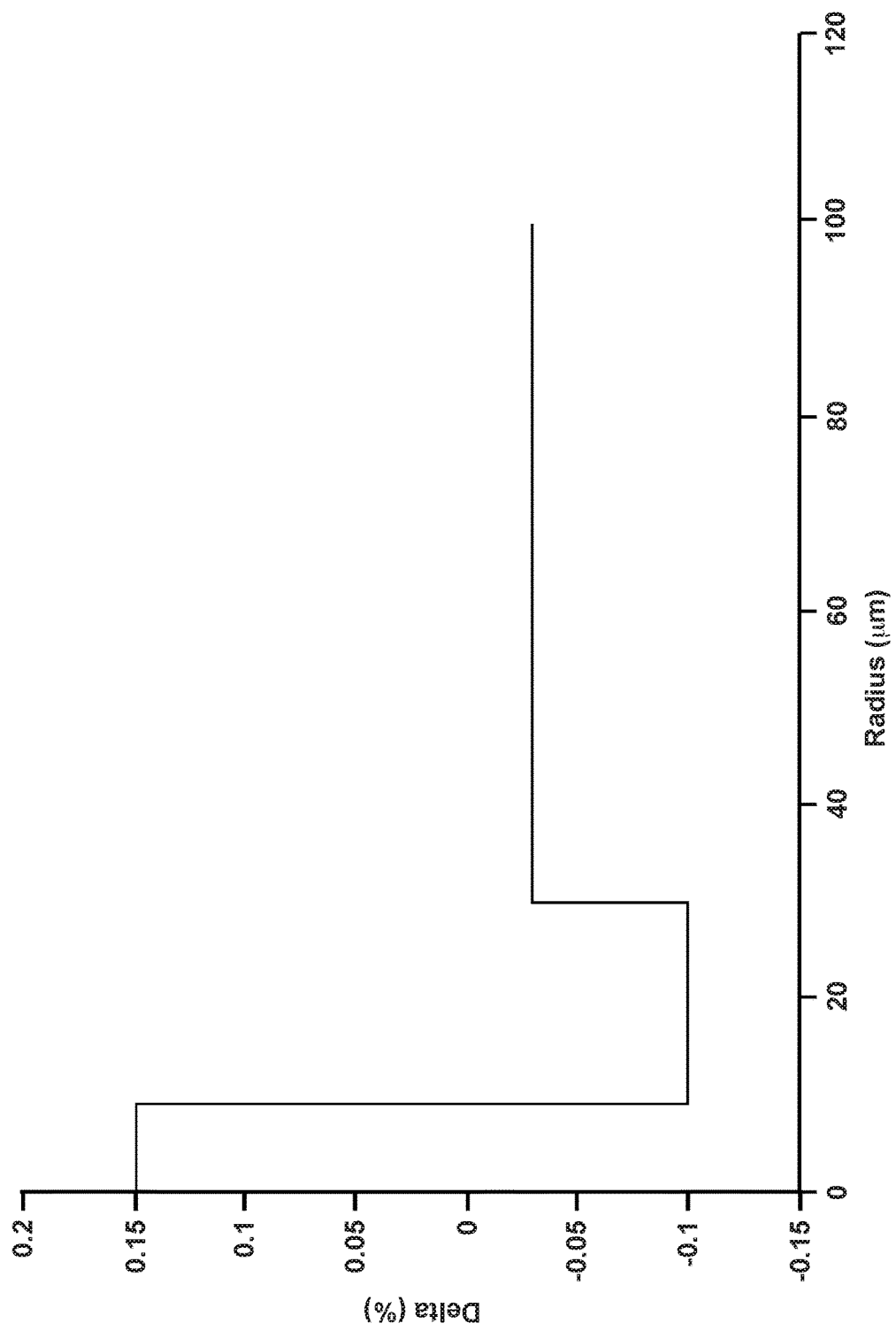
Figure 8D:
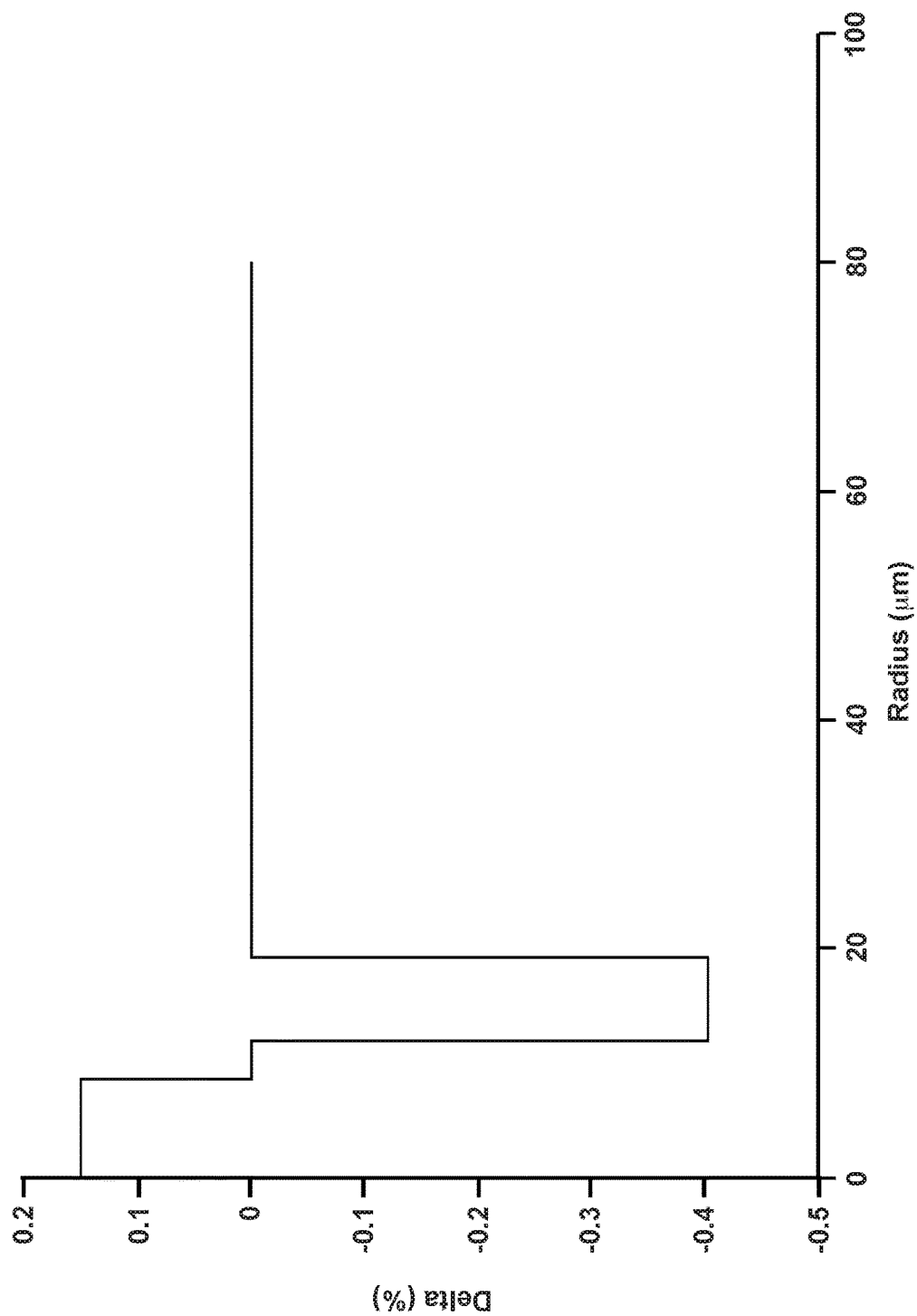

FIGS. 8A-8D show four examples of refractive index profiles, according to various embodiments of the present disclosure. In each of the example profiles shown in FIGS. 8A-8D the core 20 is doped with chlorine and the inner annular moat region is doped with fluorine. In some embodiments, the inner annular moat region is immediately adjacent the core 20 (FIGS. 8A-8C). In other embodiments, the inner annular moat region is offset from the core 20 (FIG. 8D). In the examples shown in FIGS. 8A, 8B, the cladding 30 is pure silica. In the example shown in FIG. 8C, the cladding is doped with fluorine. The cladding outer diameters for the example fibers shown in FIGS. 8A-8D are 150 µm, 175 µm, 200 µm, and 180 µm, respectively. The optical properties associated with the example fibers shown in FIGS. 8A-8D are shown below in Table 6.

The cladding outer diameter may be in the range of at least about 125 µm to less than about 200 µm, at least about 125 µm to less than 170 µm, at least about 135 µm to less than about 165 µm, at least about 145 µm to less than about 155 µm, greater than 170 µm to less than about 200 µm, greater than about 175 µm to less than about 190 µm, greater than about 180 µm to less than about 190 µm, and combinations thereof.

TABLE 6

PREDICTED OPTICAL PROPERTIES FOR 4 EXAMPLE PROFILES

| | Profile | | | |
|---|---|---|---|---|
| | 8A | 8B | 8C | 8D |
| Core Delta (%) | 0.15 | 0.15 | 0.15 | 0.15 |
| Alpha | 200 | 200 | 200 | 200 |
| Core Radius (µm) | 8.7 | 9.1 | 9.1 | 8.5 |
| Inner Cladding Delta (%) | 0 | 0 | 0 | 0 |
| Cladding Interior Edge Radius (µm) | 8.7 | 9.1 | 9.1 | 12 |
| Inner Annular Moat Region Delta (%) | −0.08 | −0.1 | −0.1 | −0.4 |
| Inner Annular Moat Region Radius (µm) | 30 | 30 | 30 | 19 |
| Cladding Delta (%) | 0 | 0 | −0.03 | 0 |
| Cladding Radius (µm) | 75 | 87.5 | 100 | 80 |
| Fiber Cutoff Wavelength (nm) | 1620 | 1699 | 1806 | 1596 |
| Cabled Cutoff Wavelength (nm) | 1605 | 1627 | 1788 | 1593 |
| MFD at 1550 nm (µm) | 15.5 | 15.6 | 15.6 | 15.5 |
| $A_{eff}$ at 1550 nm (µm²) | 203.7 | 210.9 | 210.9 | 209.8 |
| Dispersion at 1550 nm (ps/nm.km) | 22.1 | 22.3 | 22.3 | 22.8 |
| Slope at 1550 nm (ps/nm² · km) | 0.0635 | 0.0638 | 0.0638 | 0.0652 |

Relationship Between DMA and $N_T$

Figure 9A:
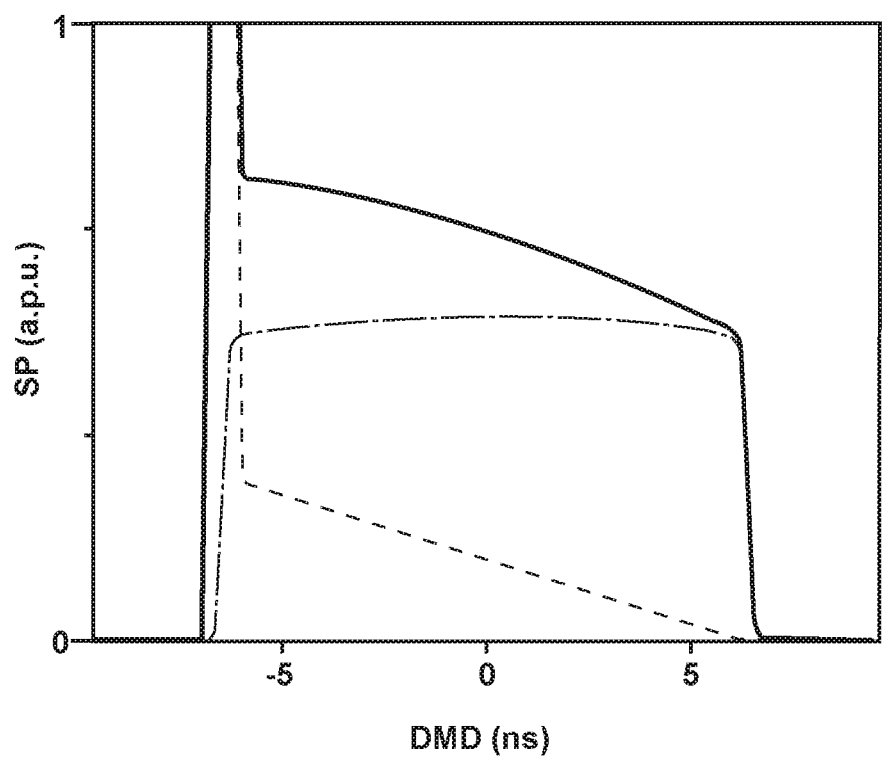
FIGS. 9A and 9B plot the signal power distribution SP in arbitrary power units (a.p.u.) as a function of the differential mode delay or DMD (ns) in a two-mode ($LP_{01}$ and $LP_{11}$) QSM optical fiber for the case where there is negligible mean differential modal attenuation or DMA (FIG. 9A) and for the case where there is a high DMA (FIG. 9B), wherein the solid shows the total power, the dashed line shows the power in the fundamental mode $LP_{01}$, and the dashed-dotted line shows the power in the higher-order mode $LP_{11}$.
Figure 9B:
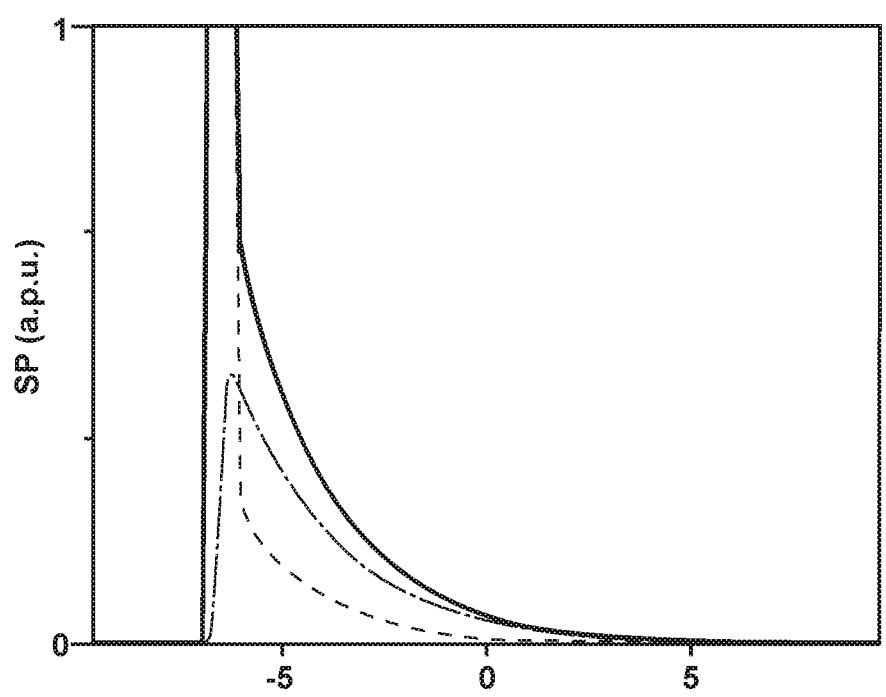

One of the advantages of QSM fiber 10 is that it reduces the number of taps needed for the digital signal processor used for MPI compensation in an optical transmission system. FIGS. 9A and 9B plot the signal power distribution SP in arbitrary power units (a.p.u.) as a function of the DMD (ns) in a two-mode ($LP_{01}$ and $LP_{11}$) QSM fiber 10. The solid line shows the total power; the dashed line shows the power in the fundamental mode $LP_{01}$; the dashed-dotted line shows the power in the higher-order mode $LP_{11}$.

In FIG. 9A, there is negligible mean DMA, while in FIG. 9B there is a high mean DMA. All other fiber parameters P were kept the same, and in both cases the signal was launched into the fundamental mode $LP_{01}$ only. The amount of significantly delayed contributions (the tail of the dashed black line) is decreased as the DMA increases. This enables use of a QSM fiber 10 having a relatively large DMD with a digital signal processor having a reduced number $N_T$ of taps as compared to conventional MPI compensation.

The amount of significantly delayed contributions (the tail of the dashed black line) is decreased as the DMA increases. This enables use of a QSM fiber 10 having a relatively large DMD with a digital signal processor having a reduced number $N_T$ of taps as compared to conventional MPI compensation.

Figure 10A:
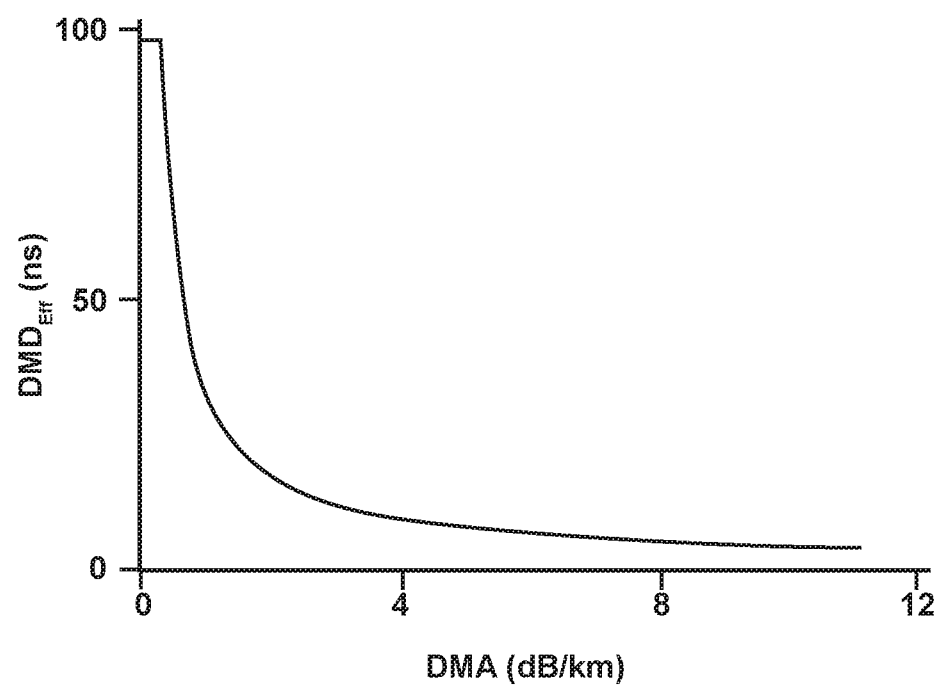
FIGS. 10A and 10B are plots of the effective DMD, denoted $DMD_{Eff}$, versus the DMA (dB/km) for an example optical transmission system that employs an example of the QSM fiber disclosed herein, wherein for FIG. 10A the DMD units are nanoseconds whereas in FIG. 10B the $DMD_{Eff}$ is in units of the tap (temporal) spacing τ of the signal processor.
Figure 10B:
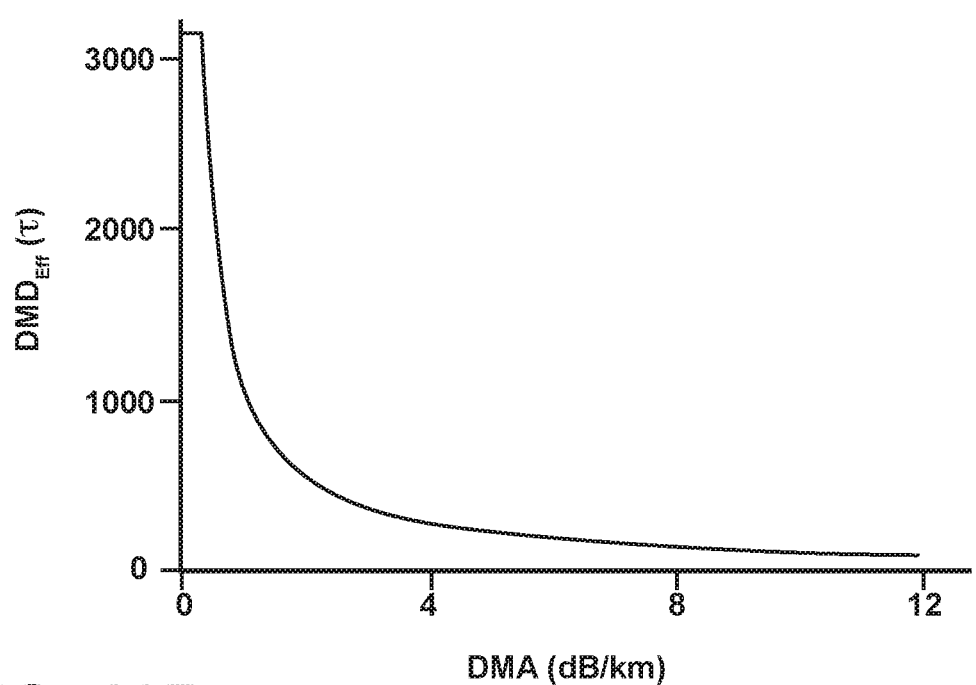

FIGS. 10A and 10B plot the effective DMD, denoted $DMD_{Eff}$, versus the DMA (dB/km) for an example optical transmission system that utilizes the QSM fiber 10 disclosed herein. In FIG. 10A, the $DMD_{Eff}$ has units of nanoseconds (ns) while in FIG. 10B the $DMD_{Eff}$ is in units of the tap (temporal) spacing τ of the signal processor, wherein each tap has a duration of 31.25 ps. The effective DMD is defined as the time interval that includes 99.95% of the interfering pulse energy and represents the amount of delay the digital signal processor needs to compensate for MPI. The calculations used to generate FIGS. 10A and 10B assume a DMD of 1 ns/km and a length L=100 km of QSM fiber 10.

The plots of FIGS. 10A and 10B show the effect of the non-zero DMA on the number $N_T$ of taps needed to compensate for the optical transmission impairment of the information-carrying optical signal traveling in the fundamental mode. The calculation of the required number $N_T$ of equalizer taps is approximate. The calculation is based on a mean MPI compensation, so the results can be considered as establishing a lower bound on the number $N_T$ of taps.

Optical Transmission System with QSM Fiber

Figure 11:
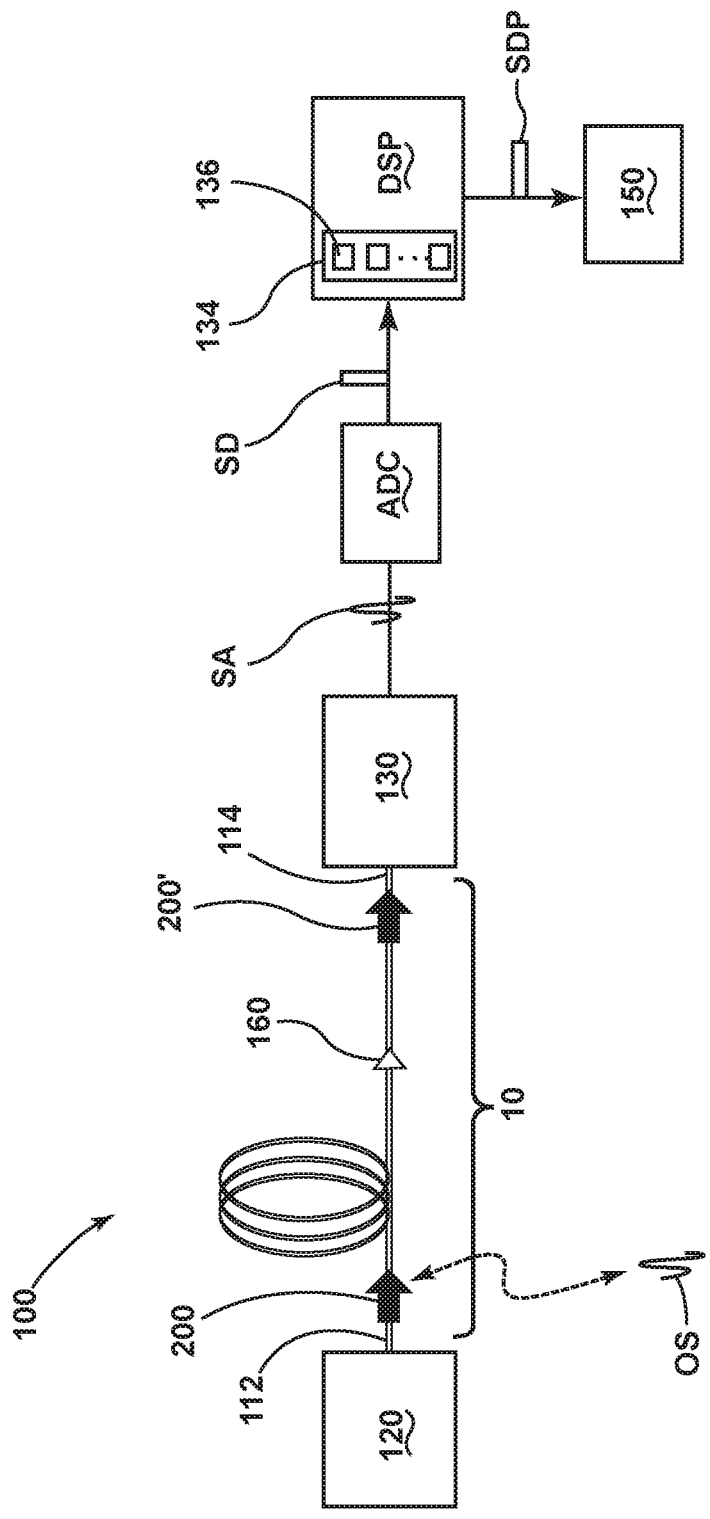
FIG. 11 is a schematic diagram of an optical transmission system that employs the QSM fiber as disclosed herein along with MPI compensation to recover the signal that travels in the fundamental $LP_{01}$ mode of the QSM fiber.

FIG. 11 is a schematic diagram of an example optical transmission system ("system") 100 that employs the QSM fiber 10 as disclosed herein. System 100 includes an optical transmitter 110, a section of QSM fiber 10, an optical receiver 130, an analog-to-digital converter ADC electrically connected to the optical receiver and a digital signal processor DSP electrically connected to the analog-to-digital converter. Also optionally included in system 100 is a decision circuit 150 electrically connected to the digital signal processor DSP.

The digital signal processor DSP includes an MPI mitigation system 134 that in an example includes a plurality of equalizer taps 136. System 100 and in particular MPI mitigation system 134 is configured to perform electronic equalization of optical transmission impairments to the optical signal using methods known in the art. In one example, MPI mitigation system 134 includes four finite impulse response (FIR) filters in a butterfly structure (not shown), wherein each filter has a number of taps 136, which are recursively adjusted based on a least-mean-square (LMS) algorithm.

The QSM fiber section 10 includes an input end 112 optically connected to optical transmitter 110 and an output end 114 optically connected to optical receiver 130, thereby establishing an optical connection between the optical transmitter and the optical receiver. In an example, QSM fiber 10 includes an amplifier 160, e.g., an EDFA.

In the operation of system 100, transmitter 110 generates light 200 that defines an input analog optical signal OS that carries information only in the fundamental mode $LP_{01}$. Light 200 enters the input end 112 of QSM fiber 10 and travels the length of the fiber to output end 114. Most of light 200 travels in the fundamental mode (LPN) while a portion of the light travels in the higher-order mode $LP_{11}$. The light 200 is denoted as 200' at the output end of QSM fiber 10 due the light having impairments described above by virtue of having traveled through QSM fiber 10.

Optical receiver 130 receives light 200' as emitted from the output end 114 of QSM fiber 10 and converts this light into a corresponding analog electrical signal SA. The analog electrical signal SA passes through analog-to-digital converter ADC, which forms therefrom a corresponding digital electrical signal SD. The digital electrical signal SD is then received by digital signal processor DSP, which performs digital processing of the digital electrical signal. In particular, the digital signal processor DSP is configured to perform equalization of MPI using MPI mitigation system 134 and the equalizer taps 136 therein based on techniques known in the art. The digital signal processor DSP outputs a processed digital electrical signal SDP that is representative (to within the limits of MPI mitigation system 134) of the initial optical signal OS generated by transmitter 110. The processed digital electrical signal SDP, which includes the information originally encoded into optical system OS, continues downstream to be processed as needed (e.g., by a decision circuit 150) for the given application.

As noted above, the relatively high DMA of ≥1 dB/km or >4 dB/km results in less complex digital signal processing, i.e., the number $N_T$ of equalizer taps 136 is reduced as compared to conventional optical transmission systems that employ MPI compensation. Also, as noted above, high DMA values also reduce the total MPI level, which may have an upper limit in terms of the efficacy of the MPI compensation digital signal processing.

It will be apparent to those skilled in the art that various modifications and variations can be made without departing from the spirit or scope of the claims.

What is claimed is:

1. A quasi-single-mode (QSM) optical fiber, comprising:
a core having a centerline and an outer edge; and
a cladding surrounding the core and having an interior edge and an exterior edge, wherein the cladding has a cladding outer diameter defined by the exterior edge of the cladding, wherein the cladding outer diameter is in the range of greater than 170 μm to about 200 μm;
wherein the QSM fiber has a cabled cutoff wavelength that is greater than about 1530 nm;
wherein the QSM fiber has a dispersion slope at 1550 nm of 0.0635 ps/nm².km to 0.0638 ps/nm².km;
wherein the core and the cladding support a fundamental mode $LP_{01}$ and a higher-order mode $LP_{11}$, and wherein the fundamental mode $LP_{01}$ has an effective area $A_{eff}$>150 μm².

2. The QSM optical fiber of claim 1, wherein the core and the cladding have a multi-path interference of less than about −30 dB per 100 km.

3. The QSM optical fiber of claim 1, wherein the cabled cutoff wavelength is less than about 2000 nm.

4. The QSM optical fiber of claim 1, wherein the core has a peak refractive index $n_0$ on the centerline and a refractive index $n_1$ at the outer edge.

5. The QSM optical fiber of claim 4, wherein the cladding has an inner annular moat region immediately adjacent the core.

6. The QSM optical fiber of claim 5, wherein the core and the cladding have a bending loss BL<0.02 dB/turn at 1625 nm and for a bend diameter $D_B$=60 mm.

7. The QSM optical fiber of claim 1, wherein the cladding further comprises:
a high-index ring that begins at a radius of at least about 40 μm from the centerline of the core, wherein the high-index ring has a refractive index change in the range of at least about 0.0005 to less than about 0.0022.

8. A quasi-single-mode (QSM) optical fiber, comprising:
a core having a centerline and an outer edge; and
a cladding surrounding the core and having an interior edge and an exterior edge;
wherein the QSM fiber has a cabled cutoff wavelength that is greater than about 1530 nm;
wherein the QSM fiber has a MFD at 1550 nm of 15.5 μm;
wherein the core and the cladding support a fundamental mode $LP_{01}$ and a higher-order mode $LP_{11}$, and wherein the fundamental mode $LP_{01}$ has an effective area $A_{eff}$>150 µm', and wherein the core and the cladding have a multi-path interference of less than about −30 dB per 100 km.

9. The QSM optical fiber of claim 8, further comprising:
a cladding outer diameter defined by the exterior edge of the cladding, wherein the cladding outer diameter is in the range of greater than 170 µm to about 200 µm.

10. The QSM optical fiber of claim 8, wherein the cabled cutoff wavelength is less than about 2000 nm.

11. The QSM optical fiber of claim 8, wherein the core has a peak refractive index no on the centerline and a refractive index $n_1$ at the outer edge.

12. The QSM optical fiber of claim 11, wherein the cladding has an inner annular moat region immediately adjacent the core.

13. The QSM optical fiber of claim 12, wherein the core and the cladding have a bending loss BL<0.02 dB/turn at 1625 nm and for a bend diameter $D_B$=60 mm.

14. The QSM optical fiber of claim 8, wherein the cladding further comprises:
a high-index ring that begins at a radius of at least about 40 µm from the centerline of the core, wherein the high-index ring has a refractive index change in the range of at least about 0.0005 to less than about 0.0022.

15. A quasi-single-mode (QSM) optical fiber, comprising:
a core having a centerline and an outer edge; and
a cladding surrounding the core and having an interior edge and an exterior edge, wherein the cladding has a cladding outer diameter defined by the exterior edge of the cladding, wherein the cladding outer diameter is in the range of greater than 170 µm to about 200 µm;
wherein the fiber has a cabled cutoff wavelength that is greater than about 1530 nm;
wherein the QSM fiber has a dispersion slope at 1550 nm of 0.0635 ps/nm².km to 0.0638 ps/nm².km;
wherein the QSM fiber has a MFD at 1550 nm of 15.5 µm;
wherein the core and the cladding support a fundamental mode $LP_{01}$ and a higher-order mode $LP_{11}$, and wherein the fundamental mode $LP_{01}$ has an effective area $A_{eff}$>150 µm², and wherein the core and the cladding have a multi-path interference of less than about −30 dB per 100 km.

16. The QSM optical fiber of claim 15, wherein the cabled cutoff wavelength is less than about 2000 nm.

17. The QSM optical fiber of claim 15, wherein the core has a peak refractive index $n_0$ on the centerline and a refractive index $n_1$ at the outer edge.

18. The QSM optical fiber of claim 17, wherein the cladding has an inner annular moat region immediately adjacent the core.

19. The QSM optical fiber of claim 18, wherein the core and the cladding have a bending loss BL<0.02 dB/turn at 1625 nm and for a bend diameter $D_B$=60 mm.

20. The QSM optical fiber of claim 19, wherein the cladding further comprises:
a high-index ring that begins at a radius of at least about 40 µm from the centerline of the core, wherein the high-index ring has a refractive index change in the range of at least about 0.0005 to less than about 0.0022.

* * * * *

UNITED STATES PATENT AND TRADEMARK OFFICE
CERTIFICATE OF CORRECTION

| | | |
|---|---|---|
| PATENT NO. | : 10,983,267 B2 | Page 1 of 1 |
| APPLICATION NO. | : 16/269112 | |
| DATED | : April 20, 2021 | |
| INVENTOR(S) | : John David Downie et al. | |

It is certified that error appears in the above-identified patent and that said Letters Patent is hereby corrected as shown below:

On the Title Page

In Column 2, item (57), Abstract, Line 11, delete "$A_{\mathit{eff}>150\ \mu m}^2$." and insert -- $A_{\mathit{eff}}>150\ \mu m^2$. --, therefor.

In the Claims

In Column 17, Line 1, Claim 8, delete "$A_{\mathit{eff}}>150\ \mu m'$," and insert -- $A_{\mathit{eff}}>150\ \mu m^2$, --, therefor.

In Column 17, Line 11, Claim 11, delete "no" and insert -- $n_0$ --, therefor.

Signed and Sealed this
Eighth Day of August, 2023

*Katherine Kelly Vidal*

Katherine Kelly Vidal
*Director of the United States Patent and Trademark Office*